United States Patent
Prasad

(10) Patent No.: US 9,411,781 B2
(45) Date of Patent: Aug. 9, 2016

(54) RULE-BASED STRUCTURAL EXPRESSION OF TEXT AND FORMATTING ATTRIBUTES IN DOCUMENTS

(75) Inventor: Rithesh R. Prasad, Coimbatore (IN)

(73) Assignee: ADOBE SYSTEMS INCORPORATED, San Jose, CA (US)

( * ) Notice: Subject to any disclaimer, the term of this patent is extended or adjusted under 35 U.S.C. 154(b) by 2026 days.

(21) Appl. No.: 11/335,737

(22) Filed: Jan. 18, 2006

(65) Prior Publication Data
US 2014/0040730 A1 Feb. 6, 2014

(51) Int. Cl.
*G06F 17/21* (2006.01)

(52) U.S. Cl.
CPC ............ *G06F 17/211* (2013.01); *G06F 17/218* (2013.01)

(58) Field of Classification Search
CPC .............................. G06F 17/211; G06F 17/218
USPC .......................................... 715/223, 236, 523
See application file for complete search history.

(56) References Cited

U.S. PATENT DOCUMENTS

| | | | |
|---|---|---|---|
| 5,129,052 A * | 7/1992 | Barker et al. ................. | 715/234 |
| 5,438,657 A * | 8/1995 | Nakatani ...................... | 715/223 |
| 5,825,944 A | 10/1998 | Wang | |
| 5,848,386 A | 12/1998 | Motoyama | |
| 5,915,259 A | 6/1999 | Murata | |
| 5,920,879 A | 7/1999 | Kyojima et al. | |
| 6,009,436 A | 12/1999 | Motoyama et al. | |
| 6,031,625 A * | 2/2000 | Sherman et al. ............. | 358/1.18 |
| 6,088,711 A * | 7/2000 | Fein et al. .................... | 715/269 |
| 6,298,357 B1 | 10/2001 | Wexler et al. | |
| 6,442,576 B1 | 8/2002 | Edelman et al. | |
| 6,453,312 B1 | 9/2002 | Goiffon et al. | |
| 6,697,999 B1 * | 2/2004 | Breuer et al. ................. | 715/236 |
| 6,799,299 B1 * | 9/2004 | Li et al. ........................ | 715/235 |
| 6,832,237 B1 | 12/2004 | Christensen et al. | |
| 6,845,483 B1 * | 1/2005 | Carroll ......................... | 715/236 |

(Continued)

FOREIGN PATENT DOCUMENTS

| | | |
|---|---|---|
| GB | 2307571 A | 5/1997 |
| JP | 03185559 A * | 8/1991 |

OTHER PUBLICATIONS

Johnson, Jeff et al. "Styles in Document Editing Systems" Computer, vol. 21, Issue 1 (Jan. 1988), pp. 32-43.*

(Continued)

*Primary Examiner* — Cesar Paula
*Assistant Examiner* — Tyler J Schallhorn
(74) *Attorney, Agent, or Firm* — Shook, Hardy & Bacon L.L.P.

(57) ABSTRACT

Methods and apparatus, including computer program products, that use record-based styles. In one aspect, a system receives an input selecting a portion of some formatted content, and generates from the selected content one or more style definitions defining a corresponding style in terms of contiguous fields, each defined in terms of units of formatted content. In another aspect, a system applies a record-based style to formatted text content, identifies one or more logical records within the formatted text content matching the style, and displays one of the logical records with a demarcation of boundaries between occurrences of fields in the record. In another aspect, a system also receives a second record-based style, and applies the second style to a result set of logical records that match the first style. In another aspect, a system also uses a record-based style as a search term to search a set of documents.

20 Claims, 19 Drawing Sheets

(56) References Cited

U.S. PATENT DOCUMENTS

| | | |
|---|---|---|
| 7,111,238 B1* | 9/2006 | Kuppusamy et al. ......... 715/269 |
| 7,134,073 B1* | 11/2006 | Fiedorowicz et al. ........ 715/235 |
| 7,143,344 B2 | 11/2006 | Parker et al. |
| 7,249,318 B1* | 7/2007 | Corell et al. .................. 715/209 |
| 7,370,274 B1* | 5/2008 | Stuple et al. .................. 715/255 |
| 7,581,173 B1* | 8/2009 | Ferguson et al. ............. 715/235 |
| 2003/0020752 A1 | 1/2003 | Santiago |
| 2003/0023634 A1* | 1/2003 | Justice et al. ................. 707/517 |
| 2003/0050929 A1 | 3/2003 | Bookman et al. |
| 2003/0229543 A1 | 12/2003 | Zimmerman et al. |
| 2003/0237046 A1 | 12/2003 | Parker et al. |
| 2004/0010752 A1 | 1/2004 | Chan et al. |
| 2004/0019589 A1 | 1/2004 | Basrur |
| 2004/0034613 A1* | 2/2004 | Purvis et al. ...................... 707/1 |
| 2004/0060007 A1 | 3/2004 | Gottlob et al. |
| 2004/0111302 A1 | 6/2004 | Falk et al. |
| 2004/0163048 A1* | 8/2004 | McKnight et al. ............ 715/517 |
| 2004/0167883 A1 | 8/2004 | Wakefield et al. |
| 2004/0205577 A1 | 10/2004 | Abe et al. |
| 2005/0132284 A1* | 6/2005 | Lloyd et al. ................... 715/517 |
| 2006/0212806 A1* | 9/2006 | Griffin et al. ................. 715/523 |
| 2006/0265689 A1 | 11/2006 | Kuznetsov et al. |
| 2007/0027882 A1* | 2/2007 | Kulkarni ....................... 707/100 |
| 2007/0061714 A1* | 3/2007 | Stuple et al. .................. 715/529 |
| 2008/0189600 A1* | 8/2008 | Lau et al. ...................... 715/235 |
| 2008/0282152 A1* | 11/2008 | McKnight et al. ............ 715/255 |
| 2009/0089696 A1* | 4/2009 | Miller et al. .................. 715/771 |

OTHER PUBLICATIONS

Gardner, James Robert et al. "XSLT and XPATH: A Guide to XML Transformations" Prentice-Hall, 2002.* van Otegem, Michiel. "Teach Yourself XSLT in 21 Days" Sams, Jan. 31, 2002.*

International Business Machines Corp. "Conversion of style based documents to arbitrary XML formats using externalized rule database" Research Disclosure Journal, Aug. 2002.*

Myers, Brad A. "Text Formatting by Demonstration". 1991, Association for Computing Machinery.*

Ono, Kouichi et al. "XSLT Stylesheet Generation by Example with WYSIWYG Editing". 2002, IEEE Computer Society.*

"Applying Nested Styles to a Paragraph, Nested Style Character Style Options" Adobe Systems Incorporated, InDesign CS Help, 2005, 4 pages.

Ossanna, et al. "TROFF User's Manual", AT&T Bell Labs, Nov. 1992, 37 pages.

Wang, et al. "Discovering Typical Structures of Documents: a Road Map Approach", Proceedings of the 21st Annual International ACM SIGIR Conference on Research and Development in Information Retrieval, 1998, Melbourne, Australia pp. 146-154.

"XSL Transformations (XSLT) Version 2.0, WC3 Working Draft Apr. 4, 2005", WC3, Apr. 4, 2005, 374 pages http://www.w3.org/TR/2005/WD-xslt20-20050404/.

* cited by examiner

Record-Based Style Dialog

Record-Based Style Name: Record Definition

Field 1:
- Count: [4,5]
- Unit: Paragraph
- Rule: [ Add Rule ]

Field 2:
- Count: [1]
- Unit: Paragraph
- Rule: Validate Word [LAST] of Paragraph [1] = "com" [ Add Rule ]

[ Create New Field ]  [ OK ]  [ Cancel ]

*FIG. 1D*

| Record-Based Style Dialog | | | |
|---|---|---|---|

Record-Based Style Name: Style Application

Field 1:

| Count | Unit | Rule |
|---|---|---|
| [1] | Paragraph | Paragraph [EVERY] = Bold |

Add Rule

Field 2:

| Count | Unit | Rule |
|---|---|---|
| [2,3] | Paragraph | Paragraph [EVERY] = Center + Italic |

Add Rule

Field 3:

| Count | Unit | Rule |
|---|---|---|
| [2] | Paragraph | Paragraph [EVERY] = Right<br>Word [1] of Paragraph [2] = Underline<br>Validate Word [LAST] of Paragraph [2] = "com" |

Add Rule

~140

Create New Field | OK | Cancel

*FIG. 1E*

Andre Agassi
72, Parry's Corner
Westend
Los Angeles - 12345
Phone: 372643
Email:agassi@abcxyz.com
David Beckham
33, King's Cross
Mulberry Ave.
Manchester
Phone: 9192837
Email:beckham@abcxyz.com
Zinedine Zidane
I-1 A, Adobe Towers,
Madrid - 98765
Phone: 988877665/3425
Email:zidane@abcxyz.com

FIG. 1F

Andre Agassi

*72, Parry's Corner*
*Westend*
*Los Angeles - 12345*

Phone: 372643
Email:agassi@abcxyz.com

David Beckham

*33, King's Cross*
*Mulberry Ave.*
*Manchester*

Phone: 9192837
Email:beckham@abcxyz.com

Zinedine Zidane

*I-1 A, Adobe Towers,*
*Madrid - 98765*

Phone: 988877665/3425
Email:zidane@abcxyz.com

FIG. 1G

Andre Agassi

*72, Parry's Corner*
*Westend*
*Los Angeles - 12345*

Phone: 372643
Email:agassi@abcxyz.com ~ 202

David Beckham

*33, King's Cross*
*Mulberry Ave.*
*Manchester*

Phone: 9192837
Email:beckham@abcxyz.com

Zinedine Zidane

*I-1 A, Adobe Towers,*
*Madrid - 98765*

Phone: 988877665/3425
Email:zidane@abcxyz.com

| Record-Based Style Dialog | | | |
|---|---|---|---|
| Record-Based Style Name | | Extracted Style | |
| Field 1: | Count<br>[1] | Unit<br>Paragraph | Rule<br>Paragraph [1] = Bold<br>Add Rule |
| Field 2: | Count<br>[1] | Unit<br>Paragraph | Rule<br>Paragraph [1] = Center<br>Paragraph [1] = Italic<br>Add Rule |
| Field 3: | Count<br>[1] | Unit<br>Paragraph | Rule<br>Paragraph [1] = Center<br>Paragraph [1] = Italic<br>Add Rule |
| Field 4: | Count<br>[1] | Unit<br>Paragraph | Rule<br>Paragraph [1] = Center<br>Paragraph [1] = Italic<br>Add Rule |
| Field 5: | Count<br>[1] | Unit<br>Paragraph | Rule<br>Paragraph [1] = Right<br>Add Rule |
| Field 6: | Count<br>[1] | Unit<br>Paragraph | Rule<br>Paragraph [1] = Right<br>Word [1] of Sentence [1] of<br>Paragraph [1] = Underline<br>Add Rule |
| Create New Field | | OK | Cancel |

*FIG._2C*

Andre Agassi is a fantastic player. A great tennis player. He has won 8 Grand Slams. And I hope he wins another. *He represents the United States of America.*

302

David Beckham is a soccer superstar. He captains his country on the soccer field. *He represents the United Kingdom.*

Zinedine Zidane is a wizard on the football field. He is almost past his prime. He was part of the World Cup winning team in 1998. *He represents France.*

*FIG. 3A*

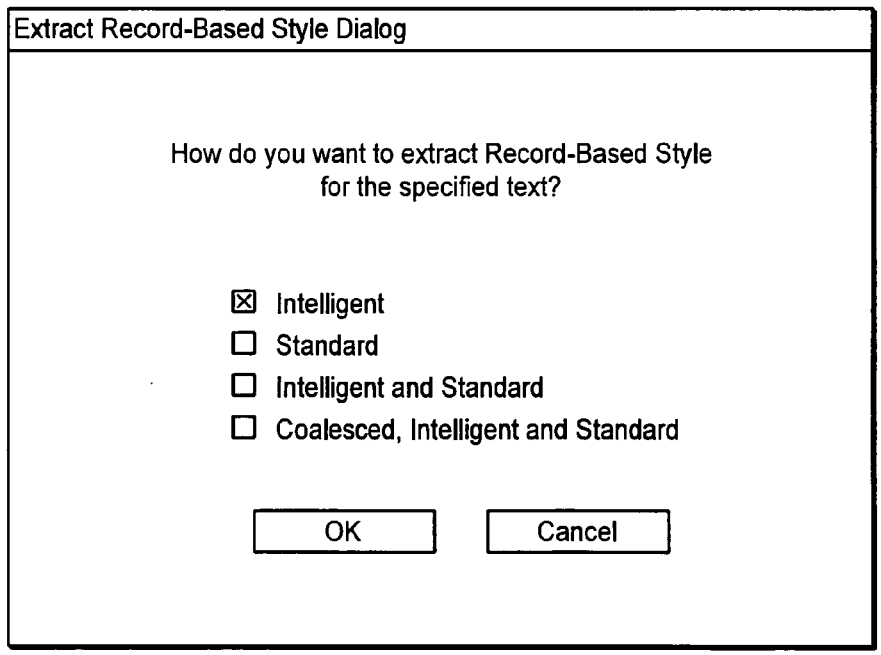

Record-Based Style Application Dialog

Apply Style on Context:

Style Defining Record-Based Style: [ Style Application ]

Apply Style on Records in Context:

Record Defining Record-Based Style: [ ]

Style Defining Record-Based Style: [ ]

[ OK ]  [ Cancel ]

FIG. 4B

Record-Based Style Application Dialog

Apply Style on Context:

Style Defining Record-Based Style: [ ]

Apply Style on Records in Context:

Record Defining Record-Based Style: [ Record Definition ]

Style Defining Record-Based Style: [ Style Application ]

[ OK ]  [ Cancel ]

RULE-BASED STRUCTURAL EXPRESSION OF TEXT AND FORMATTING ATTRIBUTES IN DOCUMENTS

BACKGROUND

The present disclosure relates to the processing of digital or electronic documents.

Many kinds of documents contain repeated instances of similarly formatted text. In classified ads or a telephone directory listings, for example, the different ads or listings will have similar formatting. Because the text in a document or a section of a document can be of similar structure, but the actual content of the text itself may differ, it can difficult to format this text. Such documents can include thousands of similar entries. With features like data merge that exist in many computer program applications, it is easy to create such documents by importing comma-separated files, for example, into a word processing or page layout application template that has appropriate placeholders. In some applications, the placeholders can have formatting that will be applied to the imported data. However, once the text is in the document, it can be difficult to reformat it, except to the extent that the individual items of text have been appropriately marked with styles that can be redefined.

Word processing applications let one create named styles with a set of attributes defined for that style. But these attributes apply to the entire range of text that is specified, and it is difficult to create a single style that by itself can apply certain attributes to certain parts of the text and other attributes to other parts of the text in the selected range.

Similarly, with markup language technologies, such as XML (Extensible Markup Language), styles can be associated with markup tags in structured documents through the use of style sheets written in a style language, such as XSL (Extensible Style Language) and parts of documents may be selected for application of style. However, the association of tags with content is essentially a manual operation, and the selection of parts of documents is based on markup constructs like attributes and elements that are already defined in the document.

In addition to being useful for formatting documents, styles in some word processing and document processing applications can be used to search for and select text based on the styles that are applied to the text. For example, it is commonplace that a user can search for and select contiguous text in a document, regardless of the content of the text, that all has formatting such as "bold and underlined".

SUMMARY

This specification describes technologies that can define style structures for formatted but unstructured text, and use such style structures, referred to in this specification as record-based styles, for a variety of purposes. With a style structure defined on the basis of regular expressions involving the basic units of text, such as letters, words, lines, sentences, and so on, a user can define rules that associate formatting attributes with the elements of an entire record, i.e., with an entire contiguous piece of a document that matches a style definition. Once such an association between structure and attributes is created, it is possible to apply such styles on similar unstructured text anywhere in a document. In addition, such styles, with or without an attribute association, can be used to select and recognize individual records or fields of text that satisfy the style definition.

This specification also describes technologies that can be used to extract a record structure—attribute association rule from a particular text.

In general, in one aspect, the invention features an apparatus, system, method, or computer program product that performs actions to, or is operable to, display formatted content from a source document to a user; receive from the user an input selecting a portion of the displayed formatted content and identifying the portion as a logical record within the source document; and generate from the formatted content of the logical record one or more style definitions, each style definition defining a corresponding style in terms of one or more contiguous fields, each field being defined in terms of a number of occurrences of a unit of formatted content, each style definition matching the entire logical record.

Particular, advantageous implementations of such systems, methods, or products include one or more of the following features. The implementations perform actions to, or are operable to, define a field in terms of a variable number of occurrences of a unit of formatted content, where the variable number of occurrences is a range of numbers occurrences, a list of numbers of occurrences, or both. The implementations perform actions to, or are operable to, present the one or more style definitions to a user. The implementations perform actions to, or are operable to, select automatically a default style from among the styles defined by the one or more style definitions; and receive as user input an apply style command and apply the default style in response to the command. The implementations perform actions to, or are operable to, receive as user input a selection of a destination portion of formatted content; and apply the default style to the destination portion of formatted content in response to the command. The destination portion of formatted content is in the source document. The destination portion of formatted content is not in the source document. The implementations perform actions to, or are operable to, receive from the user a style formatting input for a particular style definition of the one or more style definitions, the style formatting input defining a formatting change to be applied to parts of a destination document content matching the particular style definition. The source document and the destination document are the same document. The implementations perform actions to, or are operable to, receive from the user a style formatting input for a particular style definition of the one or more style definitions, the style formatting input defining a formatting change or a content change or both to be applied to parts of a destination document content matching the particular style definition. The implementations perform actions to, or are operable to, present to the user one or more samples that match a user selected style definition, each sample having a boundary at a beginning and a boundary at an end of the sample. The implementations perform actions to, or are operable to, receive a user input to change a boundary of a first sample of the one or more samples presented to the user. The implementations perform actions to, or are operable to, use the changed boundary to redefine a style definition corresponding to the first sample. The implementations perform actions to, or are operable to, use the changed boundary to generate a new style definition corresponding to the first sample. Each field can be defined in terms of units of formatted content, the units including paragraph, sentence, word, or character. Each field can be defined in terms of units of formatted content, the units including spread, page, or line. Each field can be defined in terms of a rule, the rule defining a format attribute for a corresponding unit of formatted content, the rule defining a structure of units of formatted content, or the rule defining actual content for one or more units of formatted content. A rule can also be associated with a sub unit of a field unit; for example, if the unit is a paragraph, the sub unit could be a sentence, word, or character.

In general, in another aspect, the invention features an apparatus, system, method, or computer program product that performs actions to, or is operable to, receive a first style, the first style being record-based style defined as a sequence of two or more contiguous fields, each field being defined in terms of a number of occurrences of a respective content unit structure and of one or more rules based on formatting values or content values or structure values that are associated with the respective structure; receive a first command applying the first style to formatted text content; identify in response to the first command a result set of one or more logical records within the formatted text content, the logical records being nonoverlapping, each of the logical records matching the first style; and display a first logical record in the result set with a demarcation of boundaries between occurrences of fields in the first logical record.

Particular, advantageous implementations of such systems, methods, or products include one or more of the following features. Receiving a first style includes receiving user input defining or editing the first style. The rules of the fields of the style include a rule specifying a formatting attribute and attribute value. The formatting attribute is a paragraph alignment formatting attribute. The formatting attribute is a character color formatting attribute. The content unit structures of the fields of the style include one or more of character, word, sentence, or paragraph units. The demarcation of boundaries includes highlighting each of the fields in the first logical record in a distinct color. The implementations perform actions to, or are operable to, display the first logical record in the result set with a demarcation of boundaries between occurrences of unit structures in the first logical record. The implementations perform actions to, or are operable to, perform actions to, or are operable to, display a structure of fields in the first style matching the first logical record.

In general, in another aspect, the invention features an apparatus, system, method, or computer program product that performs actions to, or is operable to, receive a first style, the first style being record-based style defined as a sequence of two or more contiguous fields, each field being defined in terms of a number of occurrences of a respective content unit structure and of one or more rules based on formatting values or content values or structure values that are associated with the respective structure; receive a second style, the second style being a record-based style defined as a sequence of two or more contiguous fields, each field being defined in terms of a number of occurrences of a respective content unit structure and of one or more rules based on formatting values or content values or structure values that are associated with the respective structure; and apply the first style to the formatted text content and apply the second style to the logical records of a result set of one or more logical records within the formatted text content that match the first style.

Particular, advantageous implementations of such systems, methods, or products include one or more of the following features. The second style can be the same as or not the same as the first style. Applying the second style to the logical records of the result set includes applying the second style only to logical records of the result set that match the second style. Applying the second style includes modifying content in accordance with the second style. Applying the second style includes modifying formatting in accordance with the second style.

In general, in another aspect, the invention features an apparatus, system, method, or computer program product that performs actions to, or is operable to, receive a first style, the first style being record-based style defined as a sequence of two or more contiguous fields, each field being defined in terms of a number of occurrences of a respective content unit structure and of one or more rules based on formatting values or content values or structure values that are associated with the respective structure; receive a first command applying the first style as a search term to a document set of documents; and identify in response to the first command a first result set of all documents in the document set having at least one logical record matching the first style.

Particular, advantageous implementations of such systems, methods, or products include one or more of the following features. The implementations perform actions to, or are operable to, highlight all logical records in the documents in the first result set that conform to the first style. The implementations perform actions to, or are operable to, receive a second command applying the first style as a search term and a search string as a search term to a set of documents and identifying in response to the second command a second result set of all documents in the set having at least one logical record matching the first style and also having an occurrence of the search string. The implementations perform actions to, or are operable to, highlight all logical records in the documents in the second result set that conform to the first style whether or not these records contain the search string. The implementations perform actions to, or are operable to, highlight all logical records in the documents in the second result set that conform to the first style and that contain the search string.

In general, in another aspect, the invention features an apparatus, system, method, or computer program product that performs actions to, or is operable to, receive a first input defining a context, the context being formatted contiguous content; receive a definition of a first style, the first style being a record-based style defined as a sequence of two or more contiguous fields, each field being defined in terms of a number of occurrences of a respective content unit structure and of one or more rules based on formatting values or content values or structure values that are associated with the respective content unit structure; and apply the first style to the context.

Particular, advantageous implementations of such systems, methods, or products include one or more of the following features. The first input defining a context is a selection input made by a user on a graphical user interface selecting a contiguous portion of content displayed on a display device. The first input defining a context is an input applying a second record-based style to content displayed on a display device. Applying the first style to the context includes modifying content in accordance with the first style. Applying the first style to the context includes modifying formatting in accordance with the first style.

Particular embodiments of the invention can be implemented to realize one or more of the following advantages. A record structure can be described in terms of fields where each field is described using the basic units of a document, e.g., characters, words, lines, sentences, and paragraphs in terms of a regular expression metaphor involving the basic units. The user need not already have a document in the form of a database or in any other structured form with defined records or other markup. The record structure selection is based on visual objects of the document (or in other words objects that are recognized by virtue of the formatting rather than a previously-defined structure) such as specific paragraphs, footnotes, pages, and so on.

The details of one or more embodiments of the invention are set forth in the accompanying drawings and the description below. Other features, aspects, and advantages of the invention will become apparent from the description, the drawings, and the claims.

BRIEF DESCRIPTION OF THE DRAWINGS

FIGS. 1A through 1E are schematic diagrams of user interface dialog windows.

FIGS. 1F and 1G illustrate example text files.

FIG. 2A illustrates a formatted text file.

FIGS. 2B and 2C are schematic diagrams of user interface dialog windows.

FIG. 3A illustrates a formatted text file.

FIGS. 3B and 3C are schematic diagrams of user interface dialog windows.

FIGS. 4A and 4B are schematic diagrams of user interface dialog windows.

Like reference numbers and designations in the various drawings indicate like elements.

DETAILED DESCRIPTION

Terms Defined and Explained

Figure 1A:
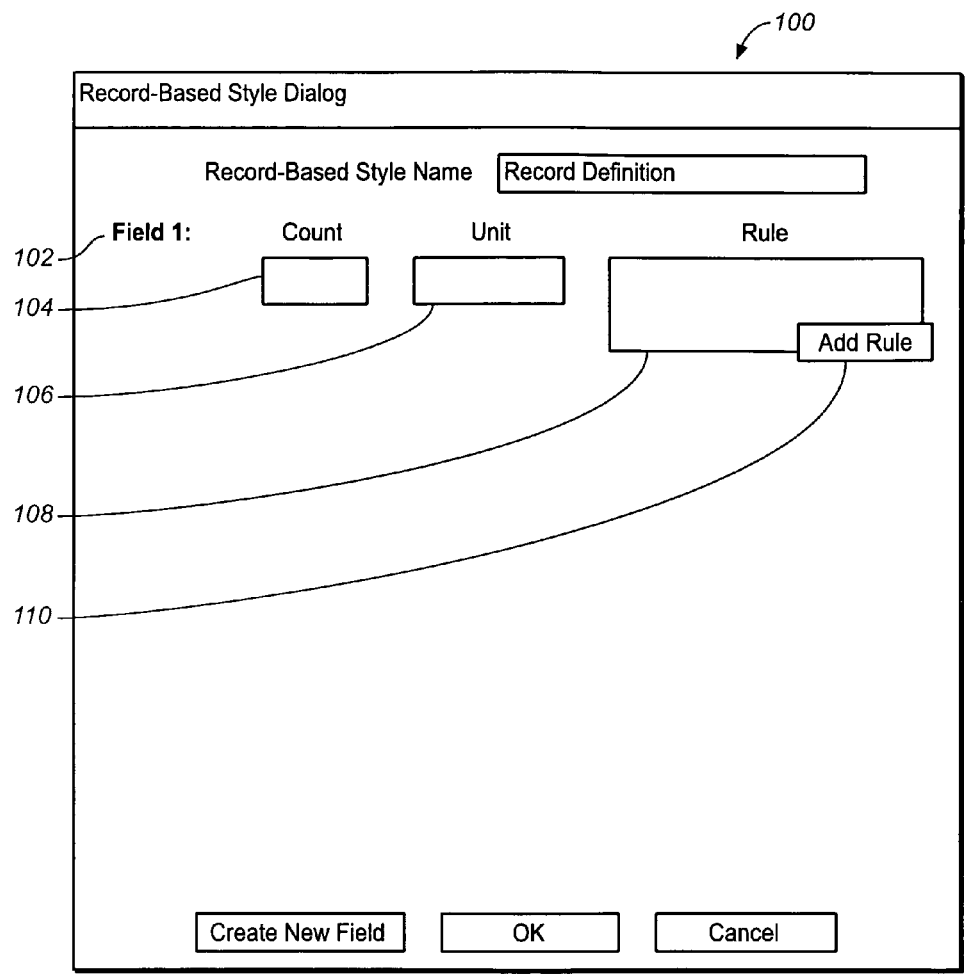

A "record-based style" is a style definition specified in terms of document structural units, attribute associations, and content value. A record-based style can be used to establish logical record boundaries within a text document based on formatted visual appearance properties of document content. After a record-based style has been used to establish or set record boundaries, the same or a different record-based style can be used to apply formatting to the records so defined. Typically, styles are defined to enable a user to apply some uniform formatting repeatedly in documents.

A record-based style can be described and defined using a fields-rules-values paradigm.

A "record" (also, a logical record) is an instance of document content that conforms to a record-based style.

A "field" is part of a record; that is, a record is defined as a set of contiguous fields, as is a record-based style. These fields are defined in terms of content units, a variable length count of such units, and some properties, that are referred to in this specification as rules, which are based on formatting values or content values or unit values that are associated with the units.

A "rule" is a property that a specific field has. It can be further defined in terms of sub-units of a field unit along with some value. A field can have more than one rule. Optionally, rules can also be associated with parts of a field, so that, for example, where a field unit is a paragraph, a sub-field unit could be a sentence, and a rule can be associated with the sub-field.

A "value" can be formatting related, content related, or structure related. A structure related value may also be referred to as a unit related value. A formatting-related value is, e.g., a character style or a paragraph style. A content related value can be a control word, e.g., "NULL", "ALPHABETS", "NUMBERS", or "PUNCTUATION"; it can also be a textual string, including a string pattern. Structure related values can have a control word, e.g., ATLEAST, ATMOST, EQUAL, or NOTEQUAL, followed by a numeral and a unit name. For example: "EQUAL 4 Sentence" is an example of a structure related value, which indicates that the corresponding unit (e.g., a paragraph) has four sentences.

A "unit" is a contiguous portion of a document in its presentation form, e.g., a paragraph, sentence, word, or character. In particular implementations, it can also signify document presentation elements such as pages, spreads, or drawing objects. A "sub-unit" is a constituent of a unit, as a word of a paragraph, or a line of a page.

In some word processing applications, a user can redefine the definition of a word or sentence. For example, some applications allow a user to specify what the delimiters for a words or sentence are, and then use the user specified delimiters to distinguish words or sentences in a range of content or in an entire document.

Subject to such redefinition, the following definitions generally apply. A "character" is any smallest single unit of text. A "word" is any text delimited by white space characters, an end of paragraph character, certain punctuation characters such as ',' or '.', a start of document text, or an end of document text. A "sentence" is text delimited by certain particular punctuation characters such as '.', end of paragraph character, start of document text, or end of document text. A "paragraph" is text delimited by an end of paragraph character, a start of document text, or an end of document text.

The following keywords and control words can also be used. The word "NUMBERS" refers to text that belongs to the set {1,2,3,4,5,6,7,8,9,0} delimited by white space an end of paragraph character, a start of document text, or an end of document text. The word "NULL" denotes "emptiness" in the context of a word, sentence, or paragraph. For example, in the context of a paragraph, a NULL paragraph is one that is empty, i.e., a paragraph that just has an end of paragraph character. The word "ALPHABET" refers to the characters [A-Z] and [a-z] in a Latin alphabet. This is the basis of the examples in this document; however, other characters are recognized as matching ALPHABET in implementations for other alphabets. The word "PUNCTUATION" refers to any punctuation mark recognized as such in the language environment of the application.

Overview

Record-based styles can be used to apply complex formatting in a single style application step. For example, one could define a record for a entry in a telephone directory, where each record has a name, and address and a phone number. It would be a tedious process to apply a specific formatting to the first word of every name in every record of the telephone directory. A user would have to determine visually where each name begins, select the first word in every name, and then apply a specific formatting. Using the technologies presented in this specification, applying such formatting becomes very easy for the user.

The fundamental uses of record-based styles are two.

1) Record-based styles can be used to find logical records in part or all of a document, or in multiple documents. 2) One record-based style can be applied on the records defined by another (or by the same) record-based style for the purpose of applying formatting to logical records. For example, the user can identify visually a single record on which to apply a record-based style; or, after selecting a range of text, the user could also apply a record-based style on the underlying selection.

There are two possible user workflows that a user can adopt with regard to formatting text in a document with an application that supports record-based styles.

1) In the first, a user would directly input a record-based style that defines the record and name it, for example, "record definition". Then the user would create another record-based style that may be defined with different fields and rules and name the style, for example, "style application". Then the user would associate the record-based style, "style application" on the record-based style "record definition" in a range of text. This range of text selected by the user will be referred to as the context.

Alternatively, the user could choose to apply the style "style application" on an underlying range of text or context directly without a record-defining record-based style association. In this case, it is implied that the context itself signifies a single record on which the formatting is to be applied.

2) The second user workflow is a slightly extended version of the first. It includes the following steps.
  a. The user selects a range of text.
  b. The program extracts a record-based style definition that fits this range of text.
  c. Once the style is extracted, the user can use the extracted record-based style to search for matching records.
  d. Then, the user can format a specific instance of a record and again extract a record-based style for this instance. The user can then determine whether if the record-based style definition is satisfactory and may edit it if required. Once satisfied with the record-based style, the user can save it and use it, either to find or to format.

Examples of User Interaction

The following paragraphs describe a number of elements of one implementation of a user interface for an application that allows a user to use record-based styles to search, edit, display, and format documents, parts of documents, and multiple documents.

FIG. 1A is a schematic diagram of a user interface dialog window 100 that allows a user to define a record-based style. A record is made up of one or more contiguous fields. Each field has a field index. The field index of the first field 102 is '1'. Every time a new field is added, the field index increments by one. As the count input 104, the user can specify a numeral. For clarity, the numbers are enclosed in [ ]; however, any conventional format for entering and displaying numbers could be used. The user can also specify multiple values. For example, the user could specify the counts as [1], [2-4], [3,8] and so on. When the user specifies a range, it means that the particular field is a variable length field. Field count is a count of the instances of the Unit in the user interface.

The unit input 106 is a drop-down control that shows the units available for the user to select. In one implementation, the units are: paragraph, sentence, line, word, and character.

The rule input 108 control allows the user to enter rules. Rules are basically properties corresponding to the field unit. The user can use the "Add Rule" button 110 to open a new add rule dialog window.

Figure 1B:
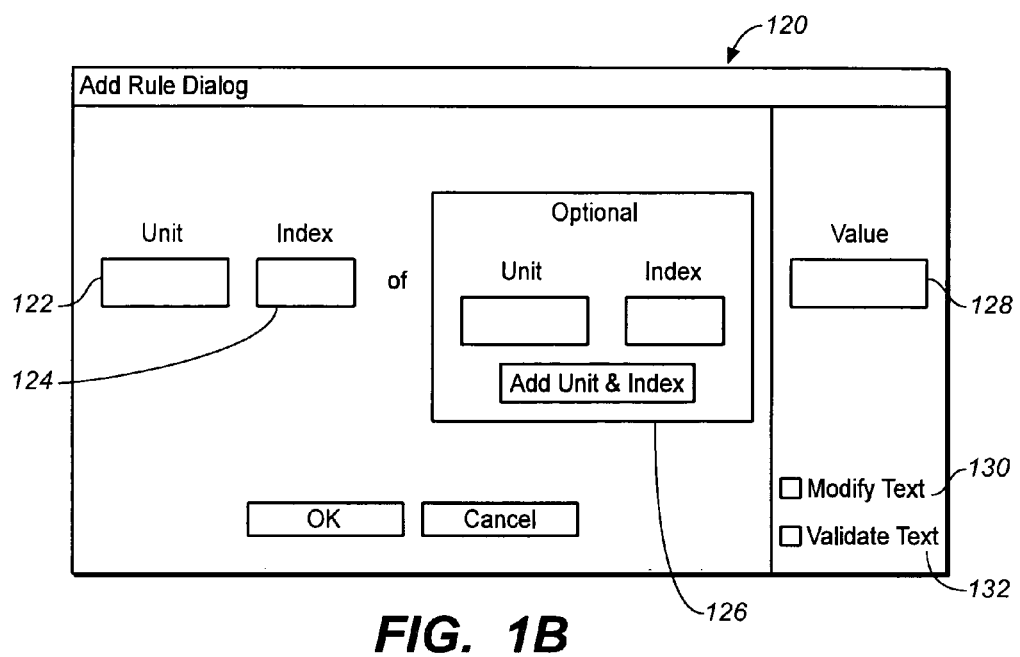

FIG. 1B is a schematic diagram of an add rule dialog window 120. Drop-down list input control 122 is a drop down of document structures. When the user defines a field as some number of paragraphs for example, the user can use the add rule dialog to specify some properties on certain substructures of this number of paragraph using this dialog. The index of a unit—i.e., the input to index input control 124—is different from the count input of the dialog for defining a record-based style (FIG. 1A). The index control provides some combo box entries such as [EVERY], [FIRST], and [LAST]. These control words have specific meanings. EVERY implies that the "Value" is satisfied for every rule unit of the field unit. Similarly, LAST refers to the last unit of the field in a given context. Additional or different control words and concepts can be used. In addition to these control words, the user can specify as an index input a number that represents an index to the specified substructure unit within the field. Thus, to the same effect, the user could select "Word" from the Unit drop down and [FIRST] from the Index combo box, or the user could select "Word" from the Unit drop down and type in "[1]" in Index combo box. Optionally, the user interface can allow the user to add more unit-and-index pairs to specify finer levels of granularity, such as Word [1] of Sentence [1] of Paragraph [1], and so on, as illustrated with dialog controls 126.

The value input control 128 allows the user to select a predefined character style, or to select a paragraph style, or to specify a control word such as "NULL", or to specify some structure such as "ATLEAST 3 Paragraph", or to provide textual input. In one implementation, a pull-down list for the values control 128 provides the following modifiers and values: NULL, EQUAL, NOTEQUAL, ATLEAST, ATMOST, ALPHABETS, and NUMBERS. The input control for value can optionally also offer and accept character styles and paragraph styles that have been defined in the document.

The modify text radio button 130 and validate text radio button 132 can be used to specify that certain values should either act as a validating filter or should modify the underlying text. For example, if the user specified that Word [1] has a Value "data", "Modify Text" would cause the application to set Word [1] to "data", whereas "Validate Text" would check if Word [1] is indeed "data".

Figure 1C:
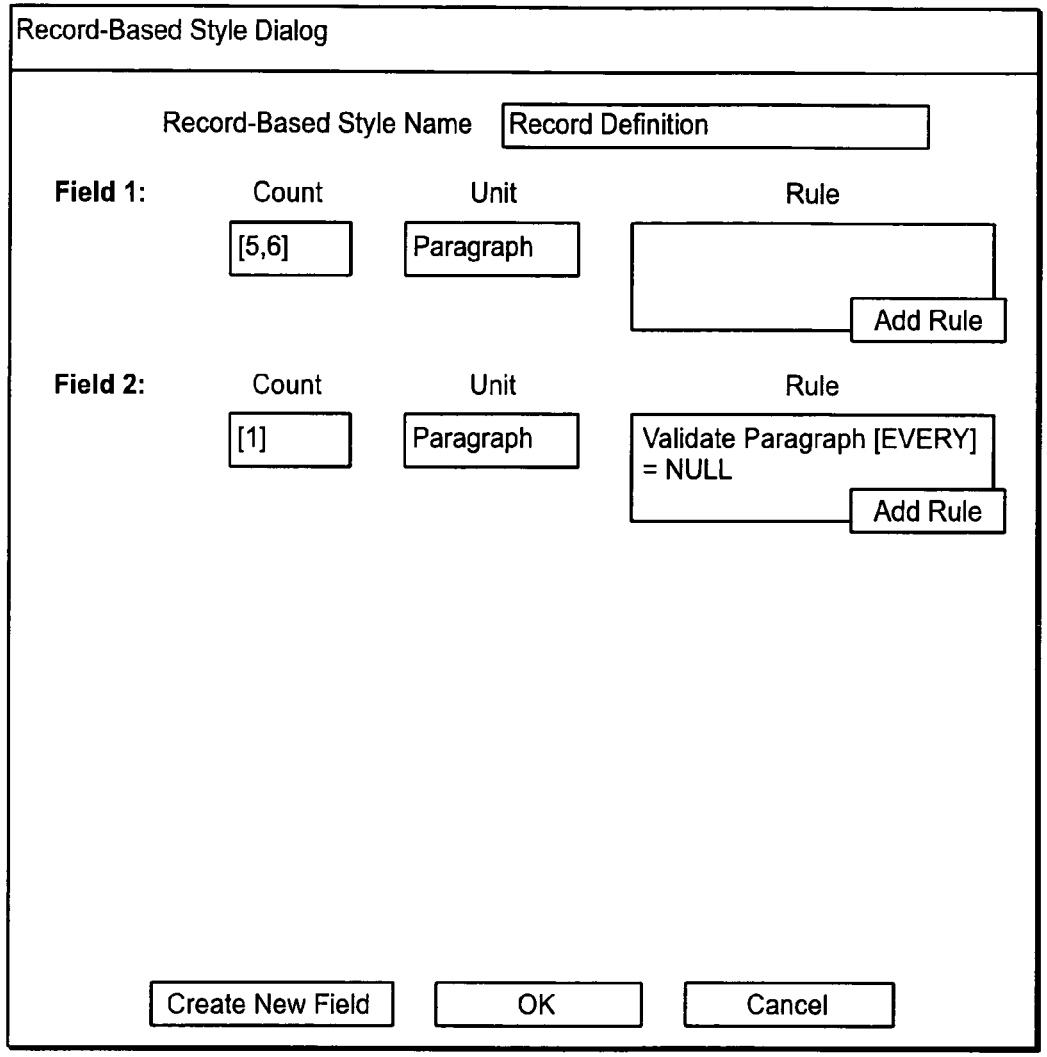

FIG. 1C illustrates a completed dialog defining a style the user has named "Record Definition". In this style, the rule for the first field is empty. This means that the user does not care what the first 5 or first 6 paragraphs look like as long as there are 5 or 6 paragraphs. The rule for the second field says that the first 5 or 6 paragraphs are followed by a single paragraph that is NULL (i.e., empty). The user could have achieved the same result by defining a style with a single field of field unit "Paragraph" that has a size [6,7] and specifying in the rule that Paragraph [LAST]=NULL.

FIG. 1D illustrates a slightly different completed dialog, also defining a style the user has named "Record Definition". As in FIG. 1C, the rule for the first field is empty. This means that the user does not care what the first 4 or first 5 paragraphs look like as long as there are 4 or 5 paragraphs. The rule for the second field says that these paragraphs are then followed by a single paragraph that has the last word of the paragraph with the content value "com", which the user is using as a placeholder. Such placeholders are useful when there are variable length fields. In this example, the first field is of variable length, i.e., it can have either 4 or 5 paragraphs.

FIG. 1E illustrates a completed dialog defining a style the user has named "Style Application". In this style, the last field in addition to specifying some formatting related rules, also has a rule 140 that "validates" that the last word of the second paragraph of the third field has a content value "com". This rule is a "validating" rule and is used to identify the record boundary and will not cause the last word to become "com" when this style is applied to a record that does not have the last word as "com".

FIG. 1F illustrates a document to which the record-based style named Record Definition of FIG. 1D was applied to identify logical records, and the record-based style named Style Application of FIG. 1E was applied for formatting. The result of the formatting is shown in FIG. 1G.

Figures 2A, 2B:
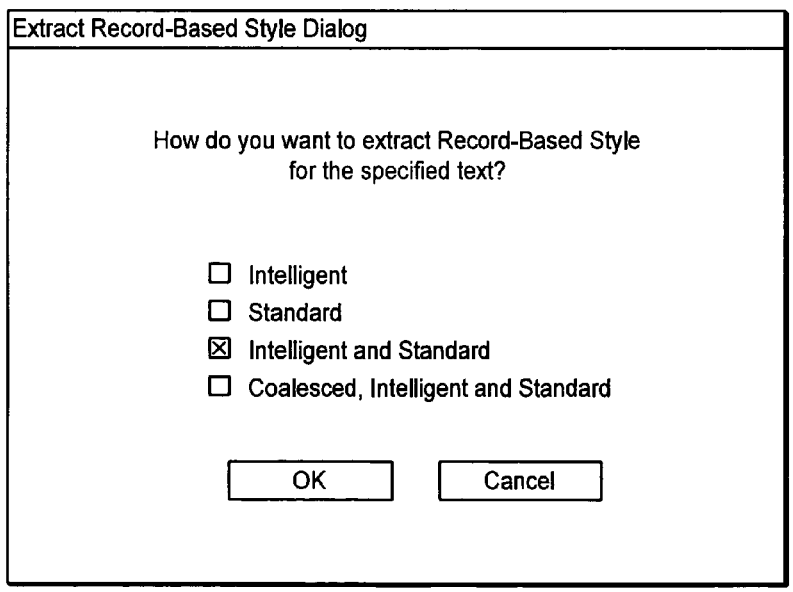

FIG. 2A illustrates a document displayed to a user, of which the user has selected a portion 202, indicated by dashed lines around the selection. (In a graphical user interface, the selection would more likely be indicated by highlighting of the selected text.) Having selected a portion to use as a model for defining a record-based style, the user can open an extract record-based style dialog window, illustrated in FIG. 2B. In this particular example, the user has selected the "intelligent and standard" option, to cause the application to extract styles using both those modes.

FIG. 2C illustrates the extracted style, shown in a style definition window. As both the intelligent record-based style and the standard record-based style are the same, only one record-based style was generated.

FIG. 3A shows a different document displayed to a user, of which the user has selected a portion 302, indicated by dashed lines around the selection. There is a similar kind of formatting on all the three paragraphs. However, each has a different number of sentences.

Having selected text that the user wants to have define a record-based style, the user opens an extract record-based style dialog window, illustrated in FIG. 3B. In this particular example, the user has selected the "Intelligent" option, to cause the application to extract styles in the intelligent form.

Figure 3C:
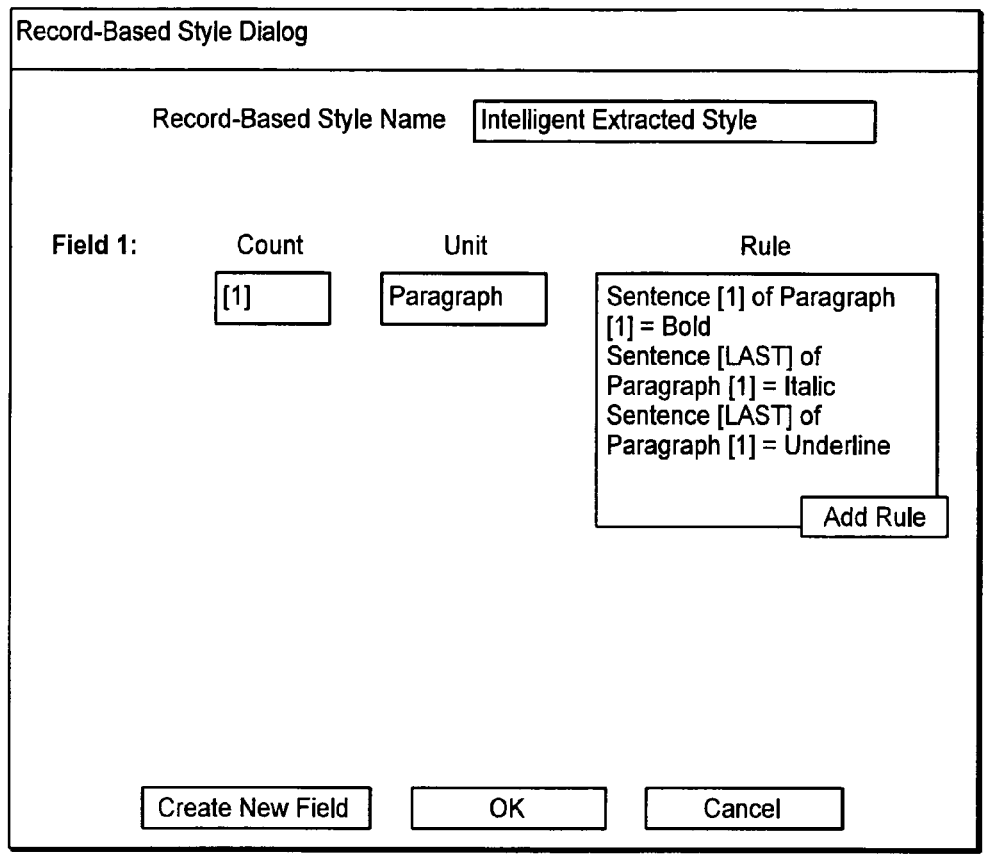

FIG. 3C shows the extracted style. If the user had chosen the "Intelligent and Standard" option, the application would have generated one more standard style corresponding to the underlying record with the definition as follows:

---
Record-Based Style Name:
"Standard Extracted Style":
Field 1: [1] Paragraph:   Sentence[1] of Paragraph[1] = Bold
                          Sentence[5] of Paragraph[1] = Italic
                          Sentence[5] of Paragraph[1] = Underline
---

FIG. 4A and FIG. 4B illustrate another dialog window that a user can use to apply record-based styles. FIG. 4A a record-based style application dialog that the user would open after having selected a portion of a document, e.g., by applying a click-and-drag action on a graphical user interface over a portion of a displayed document. In the particular example of FIG. 4A, the user has chosen to apply a style named "Style Application" to format the context that the user has already selected. In the particular example of FIG. 4B, the user has chosen to use a style named "Record Definition" to the context the user selected, which would sensibly include more than a single logical record, to identify one or more logical records within the context, and also to use a style named "Style Application" to format the logical records identified by the application of the style named "Record Definition."

Figure 5A:
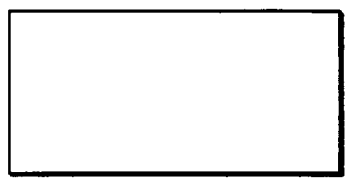
FIG. 5A illustrates the display of a document in a user interface.

FIG. 5A illustrates the display of a document that includes a number of boxes. This figure illustrates how record-based styles can be used on non-textual document structures.

Figure 5B:
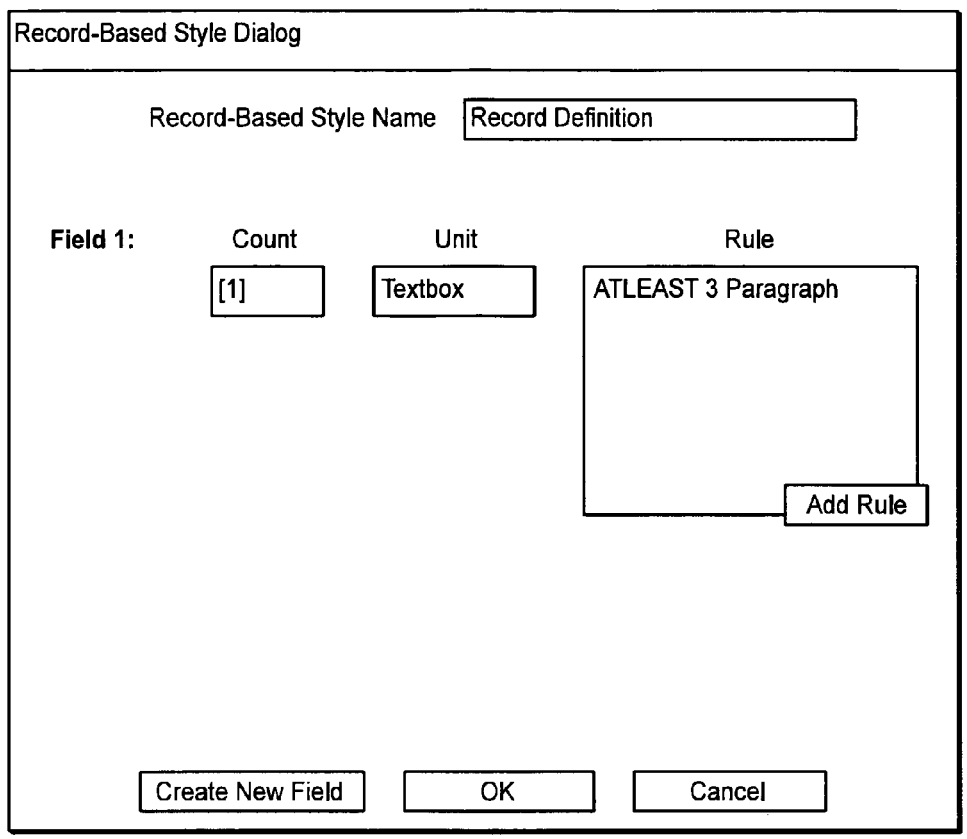
FIGS. 5B and 5C are schematic diagrams of user interface dialog windows.

FIG. 5B illustrates a record-based style named "Record Definition" that a user can use to search for matching records in the document of FIG. 5A. This style defines a record as a text box that has at least 3 paragraphs.

Figure 5C:
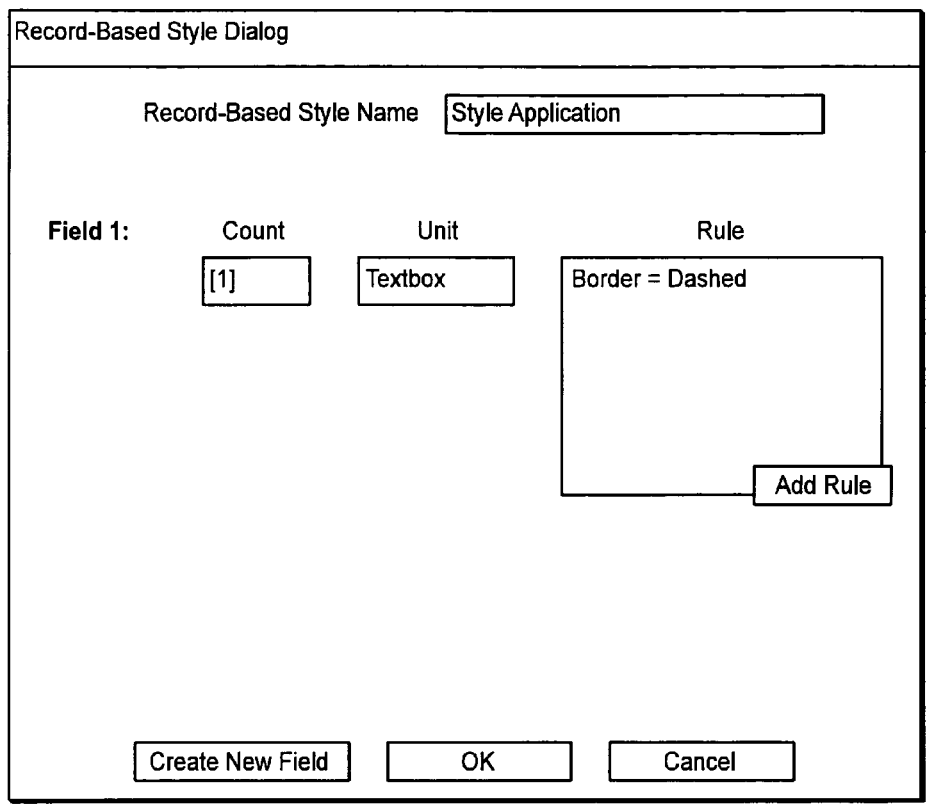

FIG. 5C illustrates a record-based style named "Style Application" that a user can define and use to define a specific kind of border on a text box.

Figure 5D:
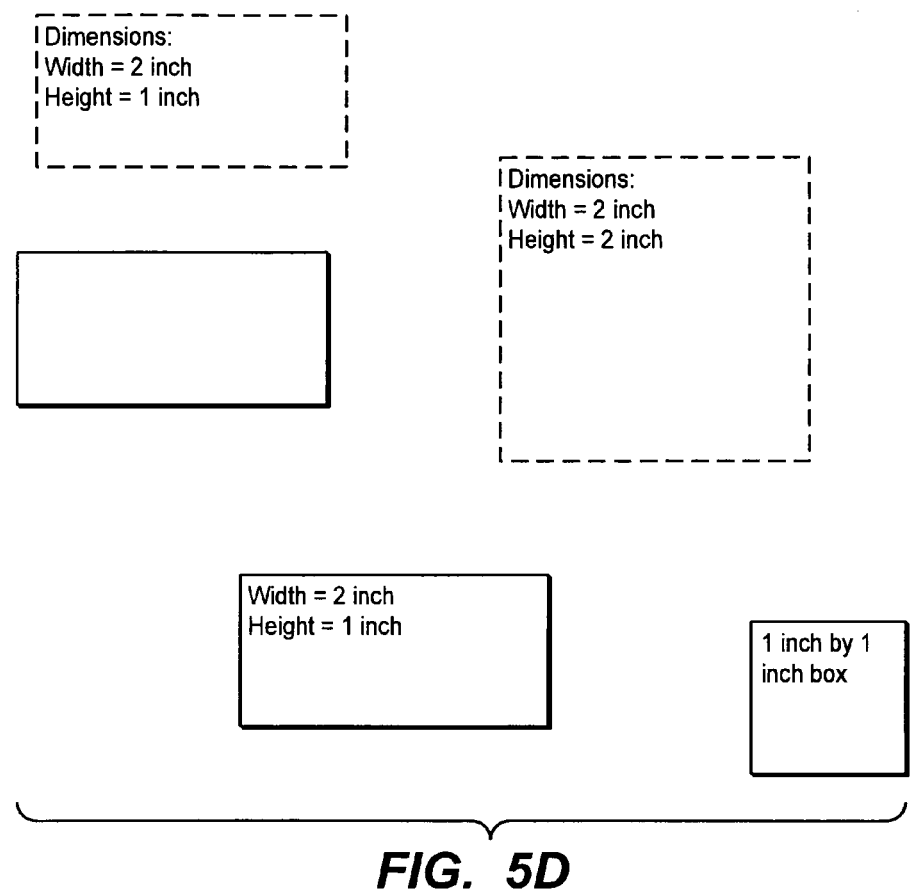
FIG. 5D illustrates the display of a document.

The user, by associating the style defining record-based style with the record defining record-based style, can apply the border only on specific text boxes, a result illustrated in FIG. 5D.

Figure 6:
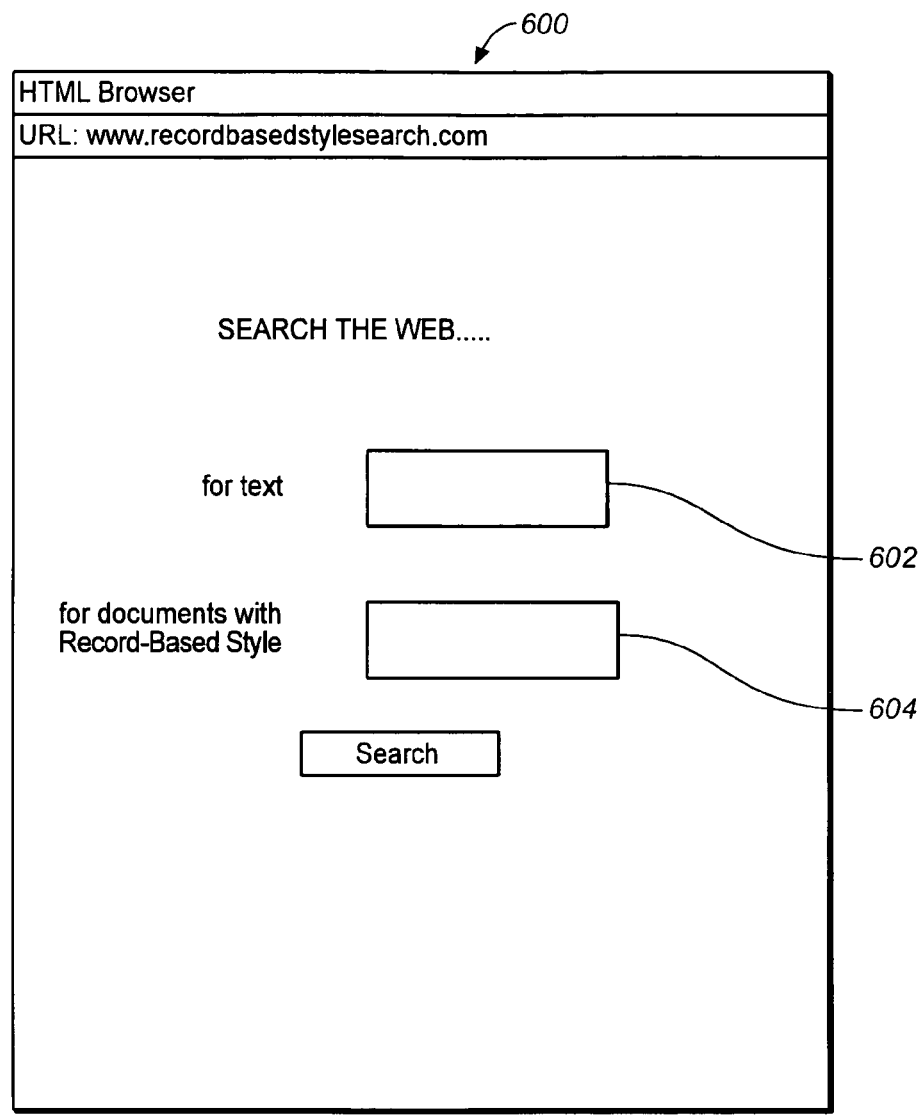
FIG. 6 illustrates a search window.

FIG. 6 illustrates a search window 600 from implemented as a web page on a web browser, but which could also be implemented in other ways and in other applications, e.g., in applications providing search tools for searching documents or files on local or remote storage for a personal or networked computer. The search tool allows the user to use record-based styles as part of the condition by providing a record-based style name or definition as a search criterion, e.g., in input control 604, in place of or in addition to a text content search condition, in input control 602.

Overview of System Processes

Figure 7:
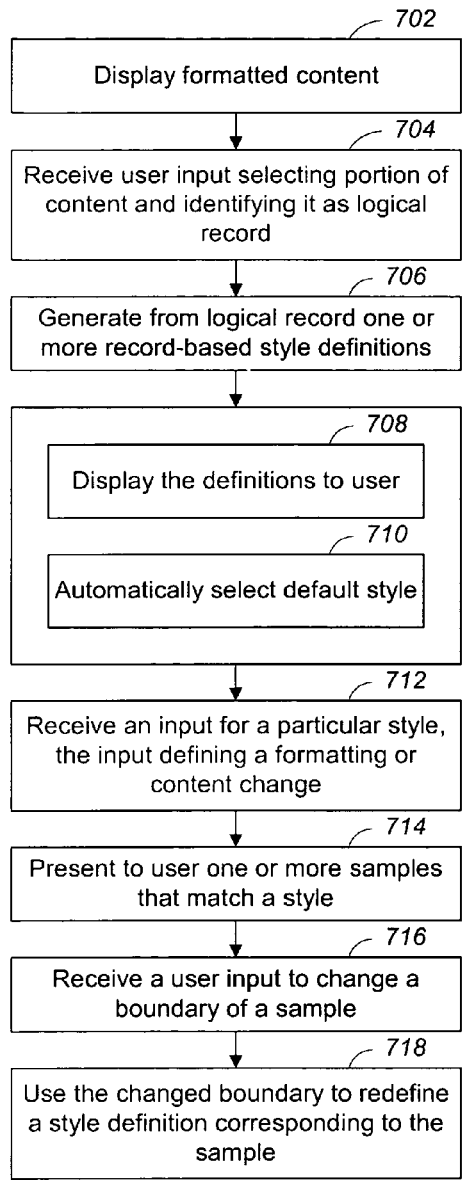
FIG. 7 illustrates a process for generating record-based styles from formatted content.

FIG. 7 illustrates a process for generating record-based styles from formatted content. A system performing this process displays formatted content, e.g., from a source document, to a user (step 702). The system then receives from the user an input selecting a portion of the displayed formatted content and identifies the portion as a logical record within the source document (step 704). This can involve the use of any user interaction technology available on the system. The system then generates, from the formatted content of the logical record, definitions for one or more record-based styles (step 706). Optionally, the system presents the one or more style definitions to a user (step 708). From this display, the user can select a style for further uses. The system can optionally also select a default style automatically from among the styles defined by the one or more style definitions (step 710). The default style can be used as the default operand for operations involving record-based styles, in default of a style expressly selected by the user. An example of such an operation is an apply style operation performed in response to an apply style command entered by a user after selection of some formatted content that the user wishes to format, which can be either in the same document or in some other document from the document, if any, that contained the content used to define the default style.

The system performing the process can optionally also receive from the user a style formatting input for a particular style definition that defines a formatting change, or a content change, or both, to be applied to parts of destination content matching the particular style definition (step 712). The destination content can be, or be part of, the source document; or it can be, or be part of, a different document.

The system performing the process can optionally also present to the user one or more samples that match a user selected style definition (step 714). Each sample has a boundary at a beginning and a boundary at an end of the sample. The system can then receive a user input to change a boundary of a first sample of the samples presented to the user (step 716) and use the changed boundary to redefine a style definition corresponding to the first sample or to generate a new style definition corresponding to the first sample with the changed boundary (step 718).

Figure 8:
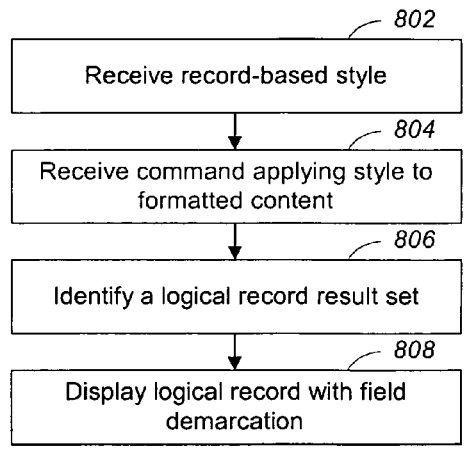
FIG. 8 illustrates a process for generating a result set from a record-based rule.

FIG. 8 illustrates a process for generating a result set from a record-based rule, no matter how the rule was created. A system performing this process receives a record-based style (step 802). In receiving the style, the system can optionally receive user input defining or identifying the style in any way, as well as user input editing a previously-defined style. User input identifying a style can be a name, pointer, or other identifier through use of which a style definition can be obtained, either from a local or from a remote source. The record-based style is defined as a sequence of two or more contiguous fields, and each field is defined as a number of occurrences of a respective content unit structure and of one or more rules based on formatting values or content values or structure values that are associated with the respective structure. The rule for a particular field can optionally be a void rule, i.e., a rule that is satisfied by all occurrences of the corresponding content unit structure. The system also receives a command applying the style to formatted text content (step 804) This can happen either before or after the style is received, or at the same time. In response to the command, the system identifies a result set of one or more logical records within the formatted text content (step 806). The logical records do not overlap each other, and each of the logical records matches the style. In response to the command, the system optionally also displays one of the logical records in the result set, showing some form a demarcation of boundaries between occurrences of fields in the displayed logical record (step 808). The demarcation of boundaries can be done by highlighting each of the fields in a logical record in a distinct color, for example, by adding demarcation characters between fields, by adding demarcation underlining, or in any other way.

Figure 9:
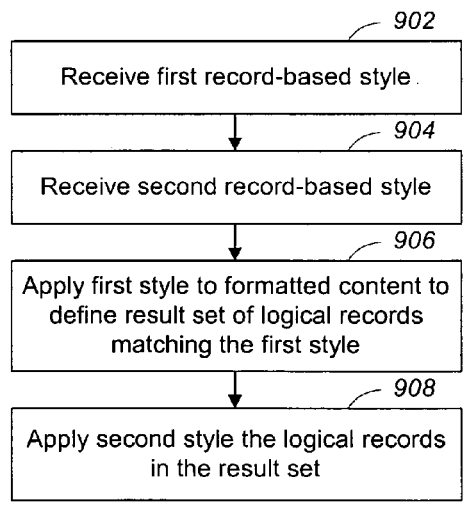
FIG. 9 illustrates a process for applying styles to a results set.

FIG. 9 illustrates a process for applying styles to a results set. A system performing this process receives a first record-based style (step 902) and a second record-based style (step 904). The system applies the first style to some formatted text content; this defines a result set of logical records in the formatted text content that each match the first style (step 906). The system applies the second style to the logical records of the result set (step 908). The styles can be applied in response to a single user command input or a sequence of user command inputs. The system can apply the second style as logical records are found as a result of applying the first style, or the system can apply the second style after all the logical records are found. The second style can be the same as or different from the first style. In applying the second style, the system can optionally apply the second style only to logical records of the result set that match the second style. In applying the second style, the system can modify content, modify formatting, or both.

Figure 10:
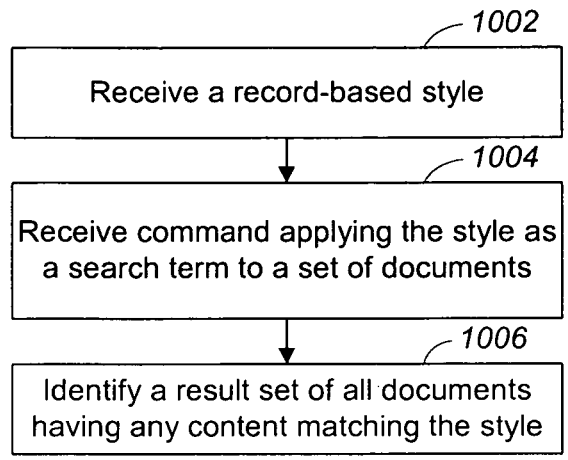
FIG. 10 illustrates a process for using a style to search a set of documents.

FIG. 10 illustrates a process for using a style to search a set of documents. A system performing this process receives a record-based style (step 1002). The system also receives a command applying the style as a search term to a set of documents (step 1004). In response, the system identifies a result set of all documents in the set of documents having any content matching the style (step 1006).

The system optionally highlights logical records that conform to the style in the documents in the result set. The system can optionally also receive and use a text search string as an additional search term to identify documents to include in, or exclude from, the result set. The application of the search string term can optionally be limited to text within logical records matching the style. The system can optionally also highlight all logical records in the documents in the result set that conform to the style whether or not these records contain the search string, or highlight all logical records in the documents in the result set that conform to the style and that contain the search string.

Figure 11:
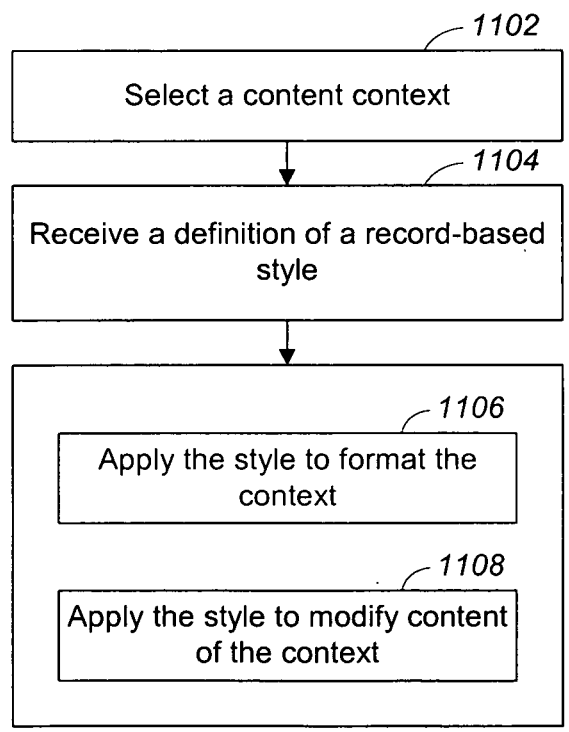
FIG. 11 illustrates a process for applying a record-based style directly to a context.

FIG. 11 illustrates a process for applying a record-based style directly to a context. A system performing this process receives an input defining a context (step 1102). The context is formatted contiguous content, e.g., content found in an electronic document. The system also receives a definition of a record-based style (step 1104). The system then applies the style to the context. Applying the style can involve one or both of formatting the context (step 1106) or modifying the content of the context (step 1108). The input defining a context can be a selection input made by a user on a graphical user interface selecting a contiguous portion of content displayed on a display device. The input defining a context be an application of a record-based style to content displayed on a display device.

Figure 12:
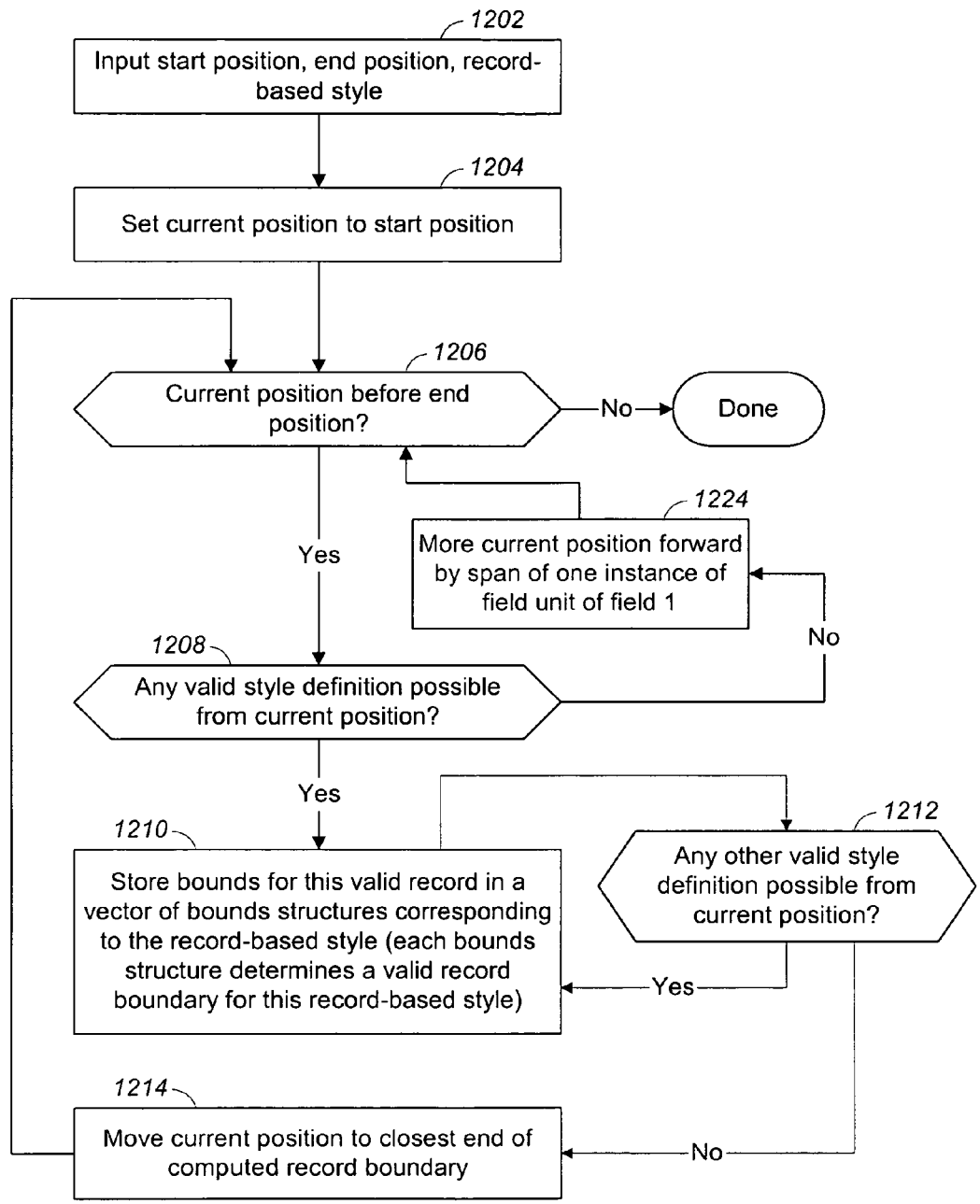
FIG. 12 illustrates a process for searching for records that correspond to a record-based style definition in a range.

FIG. 12 illustrates a process for searching for records that correspond to a record-based style definition in a range. A system performing this process receives an input start position, end position, and record-based style (step 1202). The current position is set to the start position (step 1204). Continue if the current position is before the end position (step 1206). If no valid style definition is possible from the current position (step 1208), move the current position forward by a span of one instance of a field unit of field 1 (step 1224). If any valid style definition is possible from the current position (step 1208), store the bounds for this record in a vector of bounds structures corresponding to the record-based style (each bounds structure determines a valid record boundary for this record-based style) (step 1210). If any other valid style definitions are possible from the current position (step 1212), store the bounds for these valid structures in the vector of bounds structures corresponding to the record-based style (step 1210), and move the current position to the closest end of the computed record boundary (step 1214). Repeat if the current position is before the end position (step 1206).

Data Structures

The following paragraphs describe the data structures that are used in one implementation of a system that uses record-based styles.

Unit Structure:

```
enum Unit
{
    Paragraph,
    Sentence,
    Line,
    Word,
    Character
};
```

UnitAndIndex Structure:

```
struct UnitAndIndex
{
    Unit unit;
    int index;
};
```

Field Structure:

```
struct Field
{
int fieldIndex; // To store the Field index
std::vector<int> fieldCount; // This stores a vector of field counts
//From the user interface it is possible to enter either
//a single value or a range of values for field count.
Unit fieldUnit; // The specified document structure
std::vector<Rule> RuleVec; //A collection of Rules for a specific field
};
```

Rule Structure:

```
struct Rule
{
std::vector< UnitAndIndex> UnitAndIndexVector;
    // a vector of Rule Units and their corresponding indexes
bool isValueAStyle; // true indicates the value is either a
    //character style or paragraph style; false otherwise
std::string valueString; //If value is a user specified string
int styleID;
    //Stores the styleID of the character or paragraph style.
    // NOTE: This style ID is not the style ID of a record-based style;
    // but the style ID of a normal paragraph or character style.
int KeyWord; // If the value is a
    //keyword such as "ALPHABETS", "NUMBERS", "EQUAL"
    // "NOTEQUAL", "ATLEAST", "ATMOST" etc
Unit valueUnit; // Paragraph, Sentence, Word, Character.
int valueUnitCount; // To store number of Value Units in a structure
    // related rule. Initialized with −1.
};
```

Below are some examples of what a rule structure can contain:

Example 1

Paragraph [EVERY]=RightAlign
In this case, the UnitAndIndexVector will store only one UnitAndIndex object with values UnitAndIndex.unit=Paragraph and UnitAndIndex.index=EVERY
Rule.isValueAStyle=true; (because RightAlign is a style)
Rule.valueString is empty as the value for the rule has no content
Rule.styleID=the ID of RightAlign paragraph style;
Rule.KeyWord=NONE; // as RightAlign is not a keyword.
Rule.valueUnitCount=−1 // As this is not a structure related rule.
Rule.valueUnit=DontCare; //Since valueUnitCount is −1, do not care what //valueUnit contains.

Example 2

Paragraph [3]=RightAlign
In this case, the UnitAndIndexVector will store only one UnitAndIndex object with values UnitAndIndex.unit=Paragraph and UnitAndIndex.index=3
Rule.isValueAStyle=true; (because RightAlign is a style)
Rule.valueString is empty as the value for the rule has no content
Rule.styleID=the ID of RightAlign paragraph style;
Rule.KeyWord=NONE; // as RightAlign is not a keyword.
Rule.valueUnitCount=−1 // As this is not a structure related rule.
Rule.valueUnit=DontCare; // Since valueUnitCount is −1, do not care what //valueUnit contains.

Example 3

Word[1] of Paragraph [EVERY]=RightAlign
In this case, the UnitAndIndexVector will store two UnitAndIndex objects with values:
UnitAndIndexVector[0].unit=Word
UnitAndIndexVector[0].index=1
UnitAndIndexVector[1].unit=Paragraph
UnitAndIndexVector[1].index=EVERY
Rule.isValueAStyle=true; (because RightAlign is a style)
Rule.valueString is empty as the value for the rule has no content
Rule.styleID=the ID of RightAlign paragraph style;
Rule.KeyWord=NONE; // As RightAlign is not a keyword.
Rule.valueUnitCount=−1 // As this is not a structure related rule.
Rule.valueUnit=DontCare; // Since valueUnitCount is −1, do not care what //valueUnit contains.

Example 4

Paragraph [EVERY]=NULL
In this case, the UnitAndIndexVector will store only one UnitAndIndex object with values UnitAndIndex.unit=Paragraph and UnitAndIndex.index=EVERY
Rule.isValueAStyle=false; (because NULL is a content)
Rule.valueString is empty as the value for the rule has a content which is NULL.
Rule.styleID=−1; // Since the value in the rule is a content and not a paragraph // style or a character style, this is −1 to indicate Invalid style.
Rule.KeyWord=NULL; // as NULL is a keyword.
Rule.valueUnitCount=−1 // As this is not a structure related rule.
Rule.valueUnit=DontCare; // Since valueUnitCount is −1, do not care what // valueUnit contains.

Example 5

Word [LAST] of Paragraph [2]="com"
In this case, the UnitAndIndexVector will store two UnitAndIndex objects with values:
UnitAndIndexVector[0].unit=Word
UnitAndIndexVector[0].index=LAST
UnitAndIndexVector[1].unit=Paragraph
UnitAndIndexVector[1].index=2
Rule.isValueAStyle=false; // because "com" is a content
Rule.valueString="com"
Rule.styleID=−1; // Since the value in the rule is a content and not a paragraph if style or a character style, this is −1 to indicate Invalid style.
Rule.KeyWord=NONE; // as "com" is not a keyword.
Rule.valueUnitCount=−1 // As this is not a structure related rule.
Rule.valueUnit=DontCare; // Since valueUnitCount is −1, do not care what // valueUnit contains.

Example 6

Consider the following example with a record-based style as follows:
FIELD 1: [1] Paragraph
Rule: Word [1]=Red This means that word 1 of the field unit, i.e., Paragraph has the value Red.

In this case, the UnitAndIndexVector will store one UnitAndIndex object with values:
UnitAndIndexVector[0].unit=Word
UnitAndIndexVector[0].index=1
Rule.isValueAStyle=true; // Here Red is a style
// Rule.valueString is empty as the value for the rule has no content
Rule.styleID=the ID of Red character style;
Rule.KeyWord=NONE; // as Red is not a keyword.
Rule.valueUnitCount=-1 // As this is not a structure related rule.
Rule.valueUnit=DontCare; // Since valueUnitCount is -1, do not care what // valueUnit contains.

Example 7

Because a vector of UnitAndIndex structures are stored within a rule, more depths can be supported. For example, the user could input the following rule:
WORD [1] of Sentence [3] of Paragraph[2]="com"
In this case, the UnitAndIndexVector will store three UnitAndIndex objects with values:
UnitAndIndexVector[0].unit=Word
UnitAndIndexVector[0].index=1
UnitAndIndexVector[1].unit=Sentence
UnitAndIndexVector[1].index=3
UnitAndIndexVector[2].unit=Paragraph
UnitAndIndexVector[2].index=2
Rule.isValueAStyle=false; (because "com" is a content)
Rule.valueString="com"
Rule.styleID=-1; // Since the value in the rule is a content and not a paragraph // style or a character style, this is -1
Rule.KeyWord=NONE; // as "com" is not a keyword.
Rule.valueUnitCount=-1 // As this is not a structure related rule.
Rule.valueUnit=DontCare; // Since valueUnitCount is -1, do not care what // valueUnit contains.

Example 8

There can be structure related values, as seen in the following example. Consider a record-based style defined as:
Field 1: [1] Paragraph
Rule: Paragraph[1]=EQUAL 4 Sentence
In the above example, the value of the rule specifies that the paragraph in Field 1 should have exactly 4 sentences.
In this case, the UnitAndIndexVector will store three UnitAndIndex objects with values:
UnitAndIndexVector[0].unit=Paragraph
UnitAndIndexVector[0].index=1
Rule.isValueAStyle=false; // As there is a structure related value
Rule.valueString is empty as the value for the rule has no content
Rule.styleID=// Since the value in the rule is a content and not a paragraph // style or a character style, this is -1
Rule.KeyWord=EQUAL; // as EQUAL is a keyword.
Rule.valueUnitCount=4 // As the value specifies '4' Sentence.
Rule.valueUnit=Sentence; // As the value specifies a Sentence.

Example 9

This is another example of a rule having a structure related value. The record-based style is defined as:
Field 1: [1] Paragraph
Rule: Sentence[2] of Paragraph [1]=ATLEAST 10 Word In the above example, the value of the rule specifies that the second sentence of the single paragraph in Field 1 should have at least 10 words.

In this case, the UnitAndIndexVector will store two UnitAndIndex objects with values:
UnitAndIndexVector[0].unit=Sentence
UnitAndIndexVector[0].index=2
UnitAndIndexVector[1].unit=Paragraph
UnitAndIndexVector[1].index=1
Rule.isValueAStyle=false; // As there is a structure related value
Rule.valueString is empty as the value for the rule has no content
Rule.styleID=// Since the value in the rule is a content and not a paragraph // style or a character style, this is -1
Rule.KeyWord=ATLEAST; // as ATLEAST is a keyword.
Rule.valueUnitCount=10 // As the value specifies '10' Word
Rule.valueUnit=Word; // As the value specifies a Word.

The Record-based Style Structure:

```
struct RbStyle
{
std::vector<Field> FieldVec; // a collection of Fields for the record-based style
int RbStyleID; // a unique record-based style identifier
std::string RbStyleName; // a name for the record-based style
};
```

The Bounds Structure

This structure mainly describes a class that has a start position and end position. It is used to store a range of text. A vector of Bounds structures can also be maintained to store the different record boundaries in a range of text.

```
struct Bounds
{
    int startPos;
    int endPos;
};
```

Lookup Tables

A vector (which is a kind of dynamic array) of RbStyle objects is maintained in a RbStyleVector. Helper functions are implemented that, given a record-based style ID, will search through this collection and return the appropriate field vector collection and the record-based style name. Similarly, given a record-based style name, functions will get the field vector collection and the record-based style ID.

Character and paragraph styles are what is normally seen in a word processing application. The values in the rules can store the IDs of such normal paragraph or character styles. Character and paragraph styles basically encapsulate some formatting information. For example, one could create a character style that had the formatting information "Color is Red" or another character style that had the formatting information "Color is Red and Typeface is Bold".

There are lookup tables for these character styles and paragraph styles, so that by using the character style IDs and paragraph style IDs, the formatting information corresponding to that character or paragraph style can be obtained. This formatting information can then be applied to an underlying range of text or a function can determine whether this formatting information is already applied to the underlying range of text.

The FixedStyleTableInfo Structure

This structure is used in the delegated function CheckValidStyle.

```
struct FixedStyleTableInfo
{
  Bounds bounds; // Bounds corresponding to a fixed size record-based style
  int RbStyleID; // a unique fixed size record-based style identifier
};
```

The FieldChainVector Structure

This structure is used in the delegated function CreateMultipleFixedSizeStyles.
Consider a record-based style defined as:
Field 1: Paragraph [1,2] Rule: Paragraph [1]=RightAlign
Field 2: Paragraph [1] Rule: Paragraph [1]=CenterAlign
The are two field chains possible for the above record-based style: {1,1} and {2,1}.
The field chains describe the counts of the field units of each field.
A FieldChainVector is a vector of integers that stores the counts of each field unit of a record-based style.

```
std::vector<int> FieldChainVector;
// in example, can store {1,1} or {2,1}
```

The FixedRbStyleVector Structure

This structure is used in the delegated function CreateMultipleFixedSizeStyles.

```
struct FixedRbStyleVector
{
  std::vector<int> RbStyleID; // a unique fixed size record-based style identifier
};
```

The FieldRange Structure

```
struct FieldRange
{
  Field field; //Defines a field
  Bounds bounds; // Defines the bounds corresponding to the above field.
}
```

The FieldDescriptionTable Structure

This structure is used in the Style extraction step. It basically stores a vector of FieldRange objects.

```
struct FieldDescriptionTable
{
  std::vector<FieldRange> FieldRangeVector;
}
```

The UnitRange Structure

This structure is used in the delegated function ProcessRange.

```
struct UnitRange
{
  Unit unit; // Defines a document unit.
  Bounds bounds; // Defines a range of text.
}
```

The RangeTable Structure

This table stores a vector of UnitRange objects and is used in the delegated function ProcessRange.

```
struct RangeTable
{
  std::vector<UnitRange> UnitRangeVector;
}
```

The UnitIndexStyleID Structure

This structure is used in the delegated function DetermineUnitLevelRules.

```
struct UnitIndexStyleID
{
  int index; // This stores the field index
  std::vector<styleID> styleIDVector; // This vector stores a style ID of a Paragraph
  // style or character style.
}
```

The UnitIndexStyleIDTable Structure

This structure is used in the delegated function DetermineUnitLevelRules.
This is basically a vector of UnitIndexStyleID structures where:

```
struct UnitIndexStyleIDTable
{
  std::vector< UnitIndexStyleID > UnitIndexStyleIDVector;
}
```

The RedundantUnitStyleID Structure

This structure is used in the delegated function DetermineUnitLevelRules.

```
struct RedundantUnitStyleID
{
  Unit unit;
  UnitIndexStyleID unitIndexStyleID;
};
```

The RedundantUnitStyleIDTable Structure

This structure is used in the delegated function DetermineUnitLevelRules.
This is basically a vector of the RedundantUnitStyleID structures.

```
struct RedundantUnitStyleIDTable
{
  std::vector<RedundantUnitStyleID> RedundantUnitStyleIDVector;
}
```

Processes and Functions

This section describes particular processes and functions of one implementation of a programmed system that uses record-based styles.
CreateStyle
When a user creates a new record-based style using e.g., using a record-based style dialog, the CreateStyle function creates an object of the type "RbStyle" (described above) with a unique record-based style identifier and the unique record-based style name. A user, for example, provides as input a style name for a record-based style. If this is a new record-based style, the new record-based style object is stored. Otherwise, nothing further is done and the existing record-based style is used.

CreateField

Whenever a user creates a new field for a record-based style, the CreateField function builds an appropriate "Field" structure. A user, for example, inputs field values. The system constructs a field object. The system appends the field object to a field vector in the appropriate record-based style object.

ProcessRules:

Given the rule inputs through the "Add Rule Dialog", the ProcessRules function constructs a rule object, which is described in the "Rule" structure. A user, for example, inputs rule values. The system constructs a rule object. The system appends the rule object to a rule vector contained in the appropriate field object.

Searching for Records

A process that searches for records operates on a range of text (i.e., a character start position and character end position). This is the context. The process searches the range for instances of document structures that match a record-defining record-based style and stores the record boundaries corresponding to this record-based style in a global table.

In order to determine if a record-based style is possible from a current location, the process determines whether there exists a valid "field chain" running through every field that satisfies the record definition. The record bounds spanning the start and end character positions of this matching record corresponding to the input record-defining record-based style is stored. Once this bounds is stored, the process moves to the end position of this record boundary and repeatedly looks for records that can match one valid "field chain" and stores them until the record boundary goes past the end position of the input range.

The concept of a field chain will now be explained before describing the process.

Consider as an example a document and a record-based style defined as field 1 having one paragraph with a first rule, followed by field 2 having two or three paragraphs with a second rule, followed by field 3 having one paragraph with a third rule.

When searching for the record-based style in the document, because field 2 has been defined as a variable size field (two or three paragraphs), it is necessary to determine if the pattern: 1 instance of a paragraph corresponding to field 1, 2 instances of a paragraph corresponding to field 2, followed by 2 instances of a paragraph corresponding to field 3 from the current character position satisfies the conditions described by each of the fields. If it does, then the field chain is actually:

(Field 1[1], Field 2[2],Field 3[2])

Alternatively, it may be possible that the above field chain does not satisfy the conditions at the current character position; whereas one instance of a paragraph corresponding to field 1, three instances of a paragraph corresponding to field 2, followed by two instances of a paragraph corresponding to field 3 from the current character position may satisfy the conditions described by each of the fields. If it does, the field chain is given by:

(Field 1[1], Field 2[3],Field 3[2])

Because the count of a field unit in a record can be of variable size, it maybe possible that in a large range of text, from the same position, multiple matching field chains can be found.

Two alternatives can be chosen to deal with the possibility of multiply matching field chains. The first is to select the first matching field chain. For this alternative, it is not necessary to compute other matching field chains from a position after a first matching field chain is found. The second is to give the user an option to select the appropriate record. In this case, all the possible field chains at the current location are computed and the user is asked to choose a record boundary. The choice from these alternatives can be configured as an application level preference.

Creation of Multiple Fixed-sized Record-based Styles

A process of creating multiple fixed-size record-based styles from a variable length record-based style will now be described.

A variable-length record-based style basically has some fields that can have a range of counts, i.e., more than one count.

For example, consider the following record-based style:

Field 1: [2] Paragraph+Rules This field has a fixed size. The number of different field count values possible=1.

Field 2: [2,4] Paragraph+Rules This field has a variable size. The number of different field count values possible=2.

Field 3: [4] Paragraph+Rules This field has a fixed size. The number of different field count values possible=1.

Field 4: [1,3] Paragraph+Rules This field has a variable size. The number of different field count values possible=2.

The number of new fixed-size record-based styles that will be generated from the above variable size record-based style is the product of the number of different possible field count values for each of the fields. For the above example, the number of different fixed sized record-based styles is 1*2*1*2=4.

The rules of each field remain same as the corresponding rules of the original variable sized record-based style. Only the count of each field has changed.

There are many ways in which to compute the different fixed-size record-based styles. One such way is described later in this specification under the heading CreateMultipleFixedSizeStyles.

Record Search Method

The sequence of steps involved to search for records that correspond to a record-based style definition in a range can be as follows:

---

1) Input the range of text (i.e., the character start position, the character end position). This is referred to as the context.
2) Input the record-based style, which will be used to look for matching records in the context.
3) Set current position = start position.
4) While (current position < end position)
{
5) CheckValidStyle (i.e., record) from the current position. If check fails, go to step 8). This checks whether a valid record exists that conforms to the style in the range [current position, end position].
6) Get record bounds for this record. Store this record in a table along with the input record-based style.
7) Move the current position to the end of the current record boundary and continue the loop.
8) In case the check in 5) fails, move the current position forward by the span of one instance of the field unit used to define the first field.
}
9) End

---

CheckValidStyle

This function checks if the input record-based style matches with the underlying record definition starting from the current position.

The inputs to the function are as follows:

The current position from which to determine if a valid record-based style definition exists.

A record-based style (which can be a fixed-size record-based style or a variable sized record-based style).

The outputs of this function are as follows:

Returns whether a record boundary (i.e., valid record-based style definition) was found from the current position. This is a Boolean value.

If it returns TRUE, it also returns the valid record boundary.

The function operates as follows:

1) First, the number of possible fixed record-based style definitions are created from the given record-based style definition by calling CreateMultipleFixedSizeStyles.
2) For each fixed record-based style, which is called 'style' below, determined in step 1),
{
3) Check IsValidStylePossibleAtCurrentLocation (style, position), which returns the bounds of the style if a valid style definition is possible.
4) If function in step 3) returns false, continue in the loop.
5) If function in step 3) is true, store the bounds calculated by the function and the fixed record-based style in a table FixedStyleTableInfo.
}
6) If the FixedStyleTableInfo is empty, return FALSE
7) If there is only one style in the FixedStyleTableInfo, return TRUE and also the corresponding bounds.
8) If there are multiple styles in the FixedStyleTableInfo, ask the user to select one of the record bounds. Return TRUE and the corresponding bounds.
9) End CreateMultipleFixedSizeStyles There are many ways by which it may be possible to generate the different possible fixed styles, if the input record-based style is a variable sized record-based style. One implementation is described here.

The inputs to the function are as follows:

A record-based style.

The outputs of this function are as follows:

All possible fixed record-based styles. These different record-based styles can be stored in a FixedRbStyleVector.

The function operates as follows:

1) Calculate the "numberOfFixedRbStyles" possible from the input record-based style. The formula was specified earlier.
2) If numberOfFixedRbStyles as calculated in step 1) is just one, then store the input record-based style in the FixedRbStyleVector and return;
3) Otherwise compute the different field chains possible from the variable sized record-based style, which are as many as "numberOfFixedRbStyles" and store them in a set. Let each of these field chains be a FieldChainVector.
4) for (i=0; i < numberOfFixedRbStyles; ++i)
{
5) Create a new fixed record-based style which is a copy of the input record-based style.
6) for (j=0; j < numberOfFieldsInEachStyle; ++j)
{
7) Set the fieldCount of the field[j] of the new record-based style generated in step 5) to the value stored in FieldChainVector[j]; This makes the new record-based style a fixed sized record-based style.
}
8) Store the new fixed sized record-based style in the FixedRbStyleVector.
}
9) End IsValidStylePossibleAtCurrentLocation This function checks if a range of text starting from an input character position conforms to an input fixed sized record-based style at current location.

The inputs to the function are as follows:

A character position in the document.

A fixed sized record-based style.

The outputs of this function are as follows:

TRUE/FALSE.

If the function returns TRUE, it also returns the bounds starting from the input character position which conform to the input fixed sized record-based style.

The function operates as follows:

1) Input a fixed sized record-based style.
2) Input the current character position.
3) Set position = current position.
4) Set numberOfFields = style.FieldVec.size().
5) for (i=0; i< numberOfFields; ++i)
{
6) Get the end position of the i'th field unit of a specific size (field count) from position:
fieldEndPosition = GetEndOfFieldUnit (style.fieldVec[i].unit, style.fieldVec[i].fieldCount, position).
This step gets the end position of "field count" number of field units from a given position.
7) Set numberOfRulesOfCurrentField = style.fieldVec[i].ruleVec.size
8) for (j=0; j < numberOfRulesOfCurrentField; ++j)
{
9) Set rule = style.fieldVec[i].ruleVec[j]
10) boundsVector = GetRuleUnitBounds (rule.UnitAndIndexVector, position, fieldEndPosition). boundsVector holds the vector of Bounds, where each element in the vector holds a specific range of characters.
This step basically computes the range of text that the rule applies to. For example, consider a rule that is defined as:
Rule: Word [1] = Red.
The method determines from the range [position, fieldEndPosition] what the boundaries of the first word are.
Now because one could also have a rule such as:
Rule: Word [EVERY] = Red,
the method also may need to compute the boundaries of every word in the range [position, fieldEndPosition].
One implementation of the helper function GetRuleUnitBounds is described later in the document.
11) if the rule is defined with a style value i.e., rule.styleID is valid
{
12) for every character range specified in the bounds vector
{
13) check if the formatting attributes set by the style match the corresponding attributes applied on the characters in the range.
The style defined by styleID could be a character style called "Red". This character style just defines the color attribute as "Red". The method checks if the characters in the range have Red color applied on them.

14) If check in step 13) fails, return FALSE
    }
}
15) if (rule.KeyWord)
{
    16) if ( rule.valueUnitCount is equal to −1)
    {
        17) if every character in the range specified in the bounds vector correspond to the keyword. For example, the keyword could be one of ALPHABETS, NUMBERS, or PUNCTUATIONS, and the check here would be whether every character in the range corresponds to ALPHABETS, NUMBERS, or PUNCTUATIONS.
        18) If check in step 17) fails, then return FALSE
    }
    19) Else (a structure related rule has been found)
    {
        20) Check if the range specified in the bounds vector has rule.valueUnitCount instances of rule.valueUnit as specified by the rule.isKeyWord. This check basically determines whether a range of characters has ATLEAST/ ATMOST/ EQUAL/ NOTEQUAL some number of Paragraph, Sentence, Word and Character.
        21) If check in step 20) fails, then return FALSE
    }
}
22) if (rule.valueString)
{
    23) check if every range of characters specified by each of the bounds in the boundsVector equals rule.valueString
    24) If check in step 23) fails return FALSE
    }
}
25) Set position = fieldEndPosition
}
26) outBounds = Bounds (input character position, position)
27) return TRUE and outBounds
28) End GetEndOfFieldUnit Given a field unit, the count of the field unit, and the current character position, this function returns the bounding end of this field unit. For example, given a field unit as Paragraph, the count as 2, and some position in the document text stream, this function will determine starting from the position in the stream where 2 Paragraphs end. It will then return this end position of the boundary.

The inputs to the function are as follows:
A field unit.
the count of such field units.
a character position.
The outputs of this function are as follows:
The end position of the "count" number of field units starting from the input character position.
The function operates as follows:

1) Inputs are a field unit, the count of such field units, character position
2) Set endPosition = input character position
3) if ( input field unit is character)
return (input character position + count)
4) if ( input field unit is word)
{
    Starting from the input character position, determine the end position of the count'th word.
}
5) if (input field unit is sentence)
{
    Starting from the input character position, determine the end position of the count'th sentence.
}
6) if (input field unit is paragraph)
{
    Starting from the input character position, determine the end position of the count'th word.
}
7) return endPosition
8) End GetRuleUnitBounds A rule object stores a UnitAndIndexVector. This is basically a vector of units and their corresponding indices. An explanation of this structure is provided under the heading "Rule Structures" in this document.

This helper function GetRuleUnitBounds takes as inputs a UnitAndIndexVector corresponding to a rule and a character range. It outputs a vector of Bounds structures. In other words, it may output more than one range. This is because the rules may make use of keywords such as "EVERY", in which case the function determines all the ranges of text within the input range that the rule applies to.

For example, consider the rule below:
WORD [1] of Sentence [3] of Paragraph[2]="com"
In this case, the UnitAndIndexVector will store three UnitAndIndex objects with values:
UnitAndIndexVector[0].unit=Word
UnitAndIndexVector[0].index=1
UnitAndIndexVector[1].unit=Sentence
UnitAndIndexVector[1].index=3
UnitAndIndexVector[2].unit=Paragraph
UnitAndIndexVector[2].index=2
The output of the function will be the start position and end position of the first word of the third sentence of the second paragraph in the input character range.

Because one could also have a rule such as
WORD [EVERY] of Sentence [3] of Paragraph[2]="com"
In this case, the UnitAndIndexVector will store three UnitAndIndex objects with values:
UnitAndIndexVector[0].unit=Word
UnitAndIndexVector[0].index=EVERY
UnitAndIndexVector[1].unit=Sentence
UnitAndIndexVector[1].index=3
UnitAndIndexVector[2].unit=Paragraph
UnitAndIndexVector[2].index=2
The output now will be the start position and the end position of every word appearing in the third sentence of the second paragraph in the input character range. In this case, the output holds a vector of mini bounds.

There are standard methods to calculate such start and positions. The method described below is just one possible way:

The inputs to the function are as follows:
A range of characters.
A UnitAndIndexVector.
The outputs of this function are as follows:
A set of ranges of characters.
The function operates as follows:

---

1) Input the range of characters and a UnitAndIndexVector.
2) Append the input range into a vector of bounds called "bounds".
3) Set depth = input UnitAndIndexVector.size.
4) for (i= depth; i>0; i--)
{
    5) bounds = GetRuleUnitAndIndexBounds (bounds, UnitAndIndexVector[i-1])
    Because the input UnitAndIndexVector can have many levels, the method starts to determine from the outermost ranges and then computes the innermost ranges from the outermost ranges. What this means is that when the UnitAndIndexVector describes Word [1] of Paragraph [1], the function first gets the range of paragraph 1 and determines range of word 1 from the previously returned paragraph range.
}
    6) return bounds

---

GetRuleUnitAndIndexBounds:

This function has input a vector of Bounds and a single UnitAndIndex structure.

For example, this function is given as input ranges one or more such as:

{1,30}, {44,70},{67,91}
and a UnitAndIndex structure, such as:
UnitAndIndex.unit=Word
UnitAndIndex.index=3.

With the inputs as in the above example, the function will determine the start and end position of the third word in each of the three ranges. This may generate three new ranges, such as {10,14}, {53,59},{80,87}, depending on how the words are spread out in each of the three ranges.

The function loops through every range of bounds stored in the input Bounds vector and determines the span of the unit depending on the index.

In case of the rule "Word [EVERY]", the index must be able to denote EVERY. One implementation uses special negative values of index to signify keywords such as EVERY, LAST, and so on, and thus uses the index to determine the start and end positions of the last word of every word.

The inputs to the function are as follows:
A set of ranges.
A single UnitAndIndex object.
The outputs of this function are as follows:
A set of ranges.
The function operates as follows:

---

1) Input a vector of bounds, say inputBoundsVector which hold different ranges.
2) Input a UnitAndIndex object.
3) Create a new vector of Bounds called OutputBoundsVector.
4) for (i=0; i<inputBoundsVector.size; ++i)
{
    5) Bounds bounds = inputBoundsVector[i]
    6) Set unit = inputUnitAndIndexObject.unit
    7) Set index = inputUnitAndIndexObject.index
    8) Calculate the start and end position of the "index" occurrence of "unit" structure in the range specified by bounds. Append range of [start , end position] found into the OutputBoundsVector.
    If "index" is the keyword "EVERY", calculate every start and end position of every "unit" structure in the range specified by bounds. Append each range of [start ,end position] found into the OutputBoundsVector.
    If "index" is the keyword "LAST", calculate the start and end position of the last occurrence of the "unit" structure in the range specified by bounds. Append range of [start ,end position] found into the OutputBoundsVector.
}
    9) return OutputBoundsVector.

---

Process for Applying a Record-based Style

In order to apply formatting using record-based styles, the following inputs are needed:

The inputs to the function are as follows:

a) An input range of text called the context.

b) An input style-defining record-based style. This style is referred to as a style-defining style because it will be applied to a record the way a user might apply a style to a selection of text.

c) An input vector of record boundaries corresponding to a record-defining record-based style or just a single record boundary corresponding directly to the context. A style is referred to as being a record-defining style when it will be used to identify records in a context.

The sequence of steps involved in on implementation of style application is as follows:

---

1) If the user gives an input as a record-defining record-based style, the process will first determine the different record boundaries corresponding to the record-defining record-based style that are within the input context using the Record Search method described earlier and store it in a RecordBoundaryVector. If the user specifies a single record boundary corresponding directly to the context, the RecordBoundaryVector stores the bounds of the context.
    This step yields a vector of record boundaries.
    2) for (i=0; i< RecordBoundaryVector.size ; ++i)
    {
    3) Bounds bounds = RecordBoundaryVector[i]
    4) If (IsStyleAppliableOnBounds (bounds, StyleDefiningRbStyle))
    This step checks if the style defining record-based style can be applied on the range specified by bounds.
    The function IsStyleAppliableOnBounds will be described below. This function returns a set of all the valid fixed sized record-based styles that can be created from the input "style defining" record-based style that can be applied to "bounds".
    5) If there are no fixed sized record-based styles obtained from step 4), it means that the style defining record-based style cannot be applied on the record boundary specified by bounds.
    Continue the loop:

6) If only one fixed sized record-based style is in the set returned in step 4)
{
 Set selectedStyle = the single fixed sized record-based style.
}
7) Else, if there are more than one fixed record-based styles in the set returned by step 4)
{
 Alert user that there are multiple ways if applying the input style-defining record-based style on an underlying record and set selectedStyle = the choice from the user as to which fixed sized record-based style should be applied.
}
8) Call ApplyStyle (selectedStyle, bounds)
}
9) End The above process uses the helper functions IsStyleAppliableOnBounds and ApplyStyle, which are explained below.
IsStyleAppliableOnBounds This function determines whether an input record-based style is applicable on an input range of text.

Because the input record-based style may be of variable size, it returns a set of all the possible fixed-size record-based styles variants that can be applied on the input range of text.

The following two points need to be checked:

a) During application, if a record-based style has any rule with a value string, it is necessary to see if the corresponding ranges of text in the record that map to the rule have values as specified by the value string or have the structure specified by the structure related values. Only then will the record-based style be applied on the underlying record.

b) Since a record-based style may have variable size because some fields can have different counts of units, it is necessary to see which of the possible variations of the record-based style has a size equal to the record boundary. Only then can the record-based style be applied on the underlying record boundary. If more than one fixed-sized record-based style has a size equal to the record boundary, this function will return the set of all such matching fixed sized record-based styles.

The inputs to the function are as follows:
A record boundary.
A style defining record-based style.
The outputs of this function are as follows:
FixedRbStyleVector.
The function operates as follows:

IsValidStyleAppliableAtCurrentLocation

A record-based style that is used for style application can validate itself to see if it can first be applied on an underlying range of text before actual application.

A record-based style contains rules that define one or more of:
 formatting related rules,
 content based rules, or
 structure related rules.
For example, consider the following record-based style:
Field 1:
[2] Paragraph
Rule: Word [1]=Red // Formatting related rule
Field 2:
[2] Paragraph
Rule: Word [1]="content" // Content related rule
Rule: Word [2]=NUMBERS // Content related rule
Rule: Paragraph[1]=EQUAL 5 Sentence // Structure related rule The above record-based style defines a record containing 4 paragraphs.

Now, the above record-based style will be applicable on a record containing four paragraphs only if the first word of the third paragraph of the record is "content" AND if the second word of the third paragraph is all NUMBERS AND if the third paragraph contains exactly four sentences.

As can be seen from the above example, for validating whether a record-based style can be applied on an underlying text, the formatting related rules are not considered; it only matters whether the content related rules and the structure related rules are satisfied.

One implementation of the IsValidStyleAppliableAtCurrentLocation function will now be described.

The inputs to the function are as follows:
A fixed sized record-based style
A range of text corresponding to the record boundary
The outputs of this function are as follows:

1) If the input record-based style is of variable size, then create as many unique record-based styles possible as explained under "Creation of Multiple Fixed Sized Record-based Styles". Each of these record-based styles has a fixed size.
2) for (i=0; i< number of Fixed Size Record-based Styles from step 1; ++i)
{
3) Check for each of the newly created record-based styles from step 1) if it is applicable on the input record boundary. To do this, the function IsValidStyleAppliableAtCurrentLocation is used.
     Call IsValidStyleAppliableAtCurrentLocation ( FixedSizeRbStyle[i], input record bounds)
   4) If the function is step 3) returns TRUE,
     {
   5) Append the current fixed sized record-based style into the output FixedRbStyleVector.
     }
}
6) return FixedRbStyleVector.
7) End

- TRUE/FALSE
1) Input a fixed sized record-based style.
2) Input the Record Boundary.
3) Set position = Record Boundary.start.
4) Set numberOfFields = style.FieldVec.size( ).
Get the number of fields in the input record-based style.
5) for (i=0; i< numberOfFields; ++i)
{
6) Get the end position of the i'th field unit of a specific size (field count) from position.
  fieldEndPosition = GetEndOfFieldUnit(style.fieldVec[i].unit, style.fieldVec[i].fieldCount, position).
  This step gets the end position of "field count" number of field units from a given position.
7) Set numberOfRulesOfCurrentField = style.fieldVec[i].ruleVec.size
8) for (j=0; j<numberOfRulesOfCurrentField; ++j)
{
9) Set rule = style.fieldVec[i].ruleVec[j]
10) If rule is a content related rule
{
11) boundsVector = GetRuleUnitBounds (rule.UnitAndIndexVector, position, fieldEndPosition); boundsVector holds the vector of Bounds, where each element in the vector holds a specific range of characters. This step basically computes the range of text that the rule applies to.
  12) if (rule.isKeyWord)
  {
  13) Check if every character in the range specified in the bounds vector corresponds to the keyword. One could have key words like ALPHABETS/ NUMBERS/ PUNCTUATIONS.
  14) If check in step 13) fails, then return FALSE
  }
  15) if (rule.valueString)
  {
  16) check if every range of characters specified by each of the bounds in the boundsVector equals rule.valueString
  17) If check in step 16) fails return FALSE
  }
}
18) If rule is a structure related rule:
{
19) boundsVector = GetRuleUnitBounds (rule.UnitAndIndexVector, position, fieldEndPosition); boundsVector holds the vector of Bounds, where each element in the vector holds a specific range of characters.
20) Check if each of the ranges specified in the bounds vector corresponds to the structure related rule. This checks whether the range specified in the bounds vector has ATLEAST/ ATMOST/ EQUAL/ NOTEQUAL rule.valueUnitCount instances of rule.valueUnit.
21) If check in step 20) fails, then return FALSE
}
}
23) Set position = fieldEndPosition.
}
24) Return TRUE
25) End ApplyStyle This function takes an input as a fixed-sized record-based style and a record boundary. It then applies formatting as defined by the rules of the input fixed-sized record-based style on the underlying record boundary. To apply formatting, it uses a helper function called ApplyRules.

The inputs to the function are as follows:

Fixed-Sized Record-based Style (referred as inputRbStyle)
Record Boundary

The outputs of this function are as follows:
None.

This function applies formatting specified by the input Fixed-Sized Record-based Style on the Record Boundary.

1) Set currentPosition = input Record Boundary
2) Set count = number of fields in inputRbStyle
3) For (i=0; i<count; ++i)
{

4) Set Field = inputRbStyle.fieldVec[i]
5) Set FieldCount = Field.fieldCount[0]
6) Set FieldEndPosition = GetEndOfFieldUnit (Field.fieldUnit,FieldCount, currentPosition)
  The function GetEndOfFieldUnit was explained earlier.
7) Bounds FieldBounds = {currentPosition , FieldEndPosition}
8) ApplyRules (Field, FieldBounds)
9) Set currentPosition = FieldEndPosition and continue the loop.
}
10) End ApplyRules This function applies formatting on an underlying range of text based on the rules specified for a field.

The inputs to the function are as follows:
A Field
A range of text on which formatting is to be applied. This is the input bounds.

The outputs of this function are as follows:
None.

This function applies formatting specified by the rules of the input Field on the input range of text.

The function operates as follows:

```
1) Set numberOfRules = inputField.ruleVec.size
2) for (i=0; i < numberOfRules; ++i)
{
3) Set rule = inputField.ruleVec[i]
4) Apply formatting based on a valid styleID defined on the rule, i.e., if (rule.styleID)
is valid
{
5) Set boundsVector = GetRuleUnitBounds (rule.UnitAndIndexVector, input
bounds) The ranges of text specified by the boundsVector are the ranges on which
formatting will be applied.
6) for (j=0; j < boundsVector.size( ); ++j)
{
7) ApplyFormatting (boundsVector[j].start, boundsVector[j].end, rule.styleID)
ApplyFormatting is a normal function available in conventional text processing APIs
(an Application Programming interfaces) that given a range of text and a paragraph style ID
or character style ID, applies the formatting associated with the paragraph style or character
style on the range.
}
}
}
8) End
```

Extracting a Record-based Style for a Given Range of Text

A second workflow will now be described, in which the user selects a range of text and tries to extract a record-based style conforming to the underlying selection. As explained earlier, the record-based style will be defined in terms of fields, where each field may have rules.

The user can then use the newly generated record-based style to search for other valid records in the document in a context or use the newly generated record-based styles to apply formatting directly on an underlying context or on records associated with another record-based style.

It is possible to generate multiple record-based styles that correspond to an underlying range of text. For example, when referring to the last word of a five word sentence, one could say: "LAST word" of the sentence or "Word [5]" of the sentence. The former will be referred to as the "intelligent" way; the latter, as the "standard" way.

The user is optionally asked whether the record-based style should be formulated in an intelligent way or in a standard way. Optionally, the user can also be given the choice of getting both, in which case the techniques described under the heading "Extracting Multiple Record-based Styles" would be employed.

Other ways can also be found to generate multiple record-based styles in terms of fields and rules conforming to an underlying range of text. For example, fields of a record-based style can be merged to create multiple record-based styles. This is described under the heading "Merging Multiple Fields".

Extracting a Record-based Style

The actions of one implementation of a process that extracts a single conforming record-based style will now be described.

The inputs to the process are a range of text and, optionally, a user interface option on how to create record-based styles, i.e., either intelligent or standard. The output is a record-based style.

The steps of the process are as follows.

```
1) Process the input range. The input range is broken into paragraph ranges, sentence
ranges, word ranges, and character ranges. This is explained further with reference to the
function ProcessRange. The function ProcessRange returns a RangeTable. Each entry in the
RangeTable is a UnitRange structure, i.e., a unit and its corresponding range.
2) Set the GlobalOption from the user interface to either INTELLIGENT or
STANDARD. This option is used in the helper function GetRelativeIndex.
3) For every UnitRange in RangeTable, call GetFieldDescription (UnitRange.unit,
UnitRange.range). GetFieldDescription will return a field. Store this field along with the
corresponding range specified by UnitRange.range in a table called FieldDescriptionTable.
4) The FieldDescriptionTable should already be in order. If it is not, sort the field
description table according to the ranges. Now, the FieldDescriptionTable has the fields in
order.
5) Create a new record-based style with a unique name and ID
6) for (i=0; i<FieldDescriptionTableSize; ++i)
{
7) FieldDescriptionTable[i].field.fieldIndex = i+1;
This stores the field index. Field indices are 1 based.
8) Set the field: NewRbStyle.fieldVec[i] = FieldDescriptionTable[i].field
}
9) Return the NewRbStyle
10) End
```

Extracting Multiple Record-based Styles

This is a simple extension to the process just described that extracts a single record-based style. Here follows a description of one implementation of a process that automatically tries to extract an intelligent and a standard record-based style conforming to the underlying text and to return two record-based styles if they are different.

The input to the process is a range of text. The output is a set of record-based styles.

The steps of the process are as follows.

---

1) Process the input range. The input range is broken into paragraph ranges, sentence ranges, word ranges, and character ranges. This is explained further more with reference to the function ProcessRange. The function ProcessRange returns a RangeTable. Each entry in the RangeTable is a UnitRange structure, i.e., a unit and its corresponding range.

2) Set the GlobalOption to INTELLIGENT. This option is used in the helper function GetRelativeIndex.

3) For every UnitRange in RangeTable, call GetFieldDescription (UnitRange.unit, UnitRange.range). GetFieldDescription will return a field. Store this field along with the corresponding range specified by UnitRange.range in a table called FieldDescriptionTable.

4) The FieldDescriptionTable should already be in order. If it is not, the field description table is sorted according to the ranges so that the FieldDescriptionTable has the fields in order.

5) Create a new record-based style with a unique name and ID.

6) for (i=0; i<FieldDescriptionTableSize; ++i)
{
  7) FieldDescriptionTable[i].field.fieldIndex = i+1
  8) Set the field: NewRbStyle.fieldVec[i] = FieldDescriptionTable[i].field
}

9) If the NewRbStyle is different from the record-based styles in the output Record-based Style Set, append NewRbStyle to the Output Record-based Style Set.

10) If GlobalOption is INTELLIGENT, set GlobalOption to STANDARD and go to step 3.

11) Return Output Record-based Style Set.

12) End

---

ProcessRange:

This is a function that extracts the valid ranges in a range of text.

The input to the process is a range of text [x, y]. The output is the valid ranges of whole paragraphs, whole sentences, whole words, and the characters from the range, stored in a table.

Consider the following example, in which the input range starts from the middle of a paragraph, then extends over a one complete paragraph, and then ends in the middle of a paragraph.

First, the range of the valid paragraph, i.e., [Paragraph Start, Paragraph End] is extracted and this information is stored. Because of this extraction, the input range [x, y] is broken as [x, Paragraph Start −1] and [Paragraph End +1, y]. There can be at the most two unprocessed ranges after this step.

From these remaining two unprocessed ranges, the valid sentence ranges are extracted and stored. There can be at the most two unprocessed ranges after this step, from which the valid words are determined. Finally, there may still be two unprocessed ranges. From these, the function extracts the bounds of every valid non-whitespace character.

The steps of one implementation of the function are as follows.

1) Set UnprocessedRangeList to contain the input range.

2) From every unprocessed range [x, y] in the UnprocessedRangeList, extract the bounds of every whole paragraph contained in this range and store these bounds in the RangeTable. Whenever a valid paragraph bounds is determined, break the unprocessed range as [x, ParagraphStart −1] and [Paragraph end +1, end]. Now, process the range [Paragraph end +1, end] for more whole paragraphs. When there are no more paragraphs possible in the unprocessed ranges, move to the next step. The UnprocessedRangeList may now contain at the most two ranges.

2) From every unprocessed range [x, y] in the UnprocessedRangeList, extract the bounds of every whole sentence contained in this range and store these bounds in the RangeTable. Whenever a valid sentence bounds is determined, break the unprocessed range as [x, SentenceStart −1] and [Sentence end +1, end]. Now, process the range [Sentence end +1, end] for more whole sentences. When there are no more sentences possible in the unprocessed ranges, move to the next step. The UnprocessedRangeList may now contain at the most two ranges.

3) From every unprocessed range [x, y] in the UnprocessedRangeList, extract the bounds of every whole word contained in this range and store these bounds in the RangeTable. Whenever a valid word bounds is determined, break the unprocessed range as [x, WordStart −1] and [Word end +1, end]. Now, process the range [Word end +1, end] for more whole words. When there are no more words possible in the unprocessed ranges, move to the next step. The UnprocessedRangeList may now contain at the most two ranges.

4) From every unprocessed range [x, y] in the UnprocessedRangeList, extract the bounds of every valid non-whitespace character contained in this range and store these bounds in the RangeTable.

5) Return the RangeTable

6) End

GetFieldDescription:

This is a function that processes an input range and returns a field.

The input to the process are a unit and a range. The output is a field.

The function processes the input range and returns a field. Recall that every field has a field unit, a field count, and a set of rules. The field unit of the field is the same as the input unit, the field count is set to 1. The field.ruleVec is filled with the rules applicable for this field unit. The only thing that is not filled in the output field is the index of the field. This will be filled in later when adding the fields to the record-based style.

The steps of one implementation of the function are as follows.

---

1) Input unit and corresponding range.
2) Create a field object called "Field".
3) Field.fieldUnit = unit;
4) Field.fieldCount = 1
5) If input range is empty and input unit is Paragraph, the input is an empty paragraph.
{

-continued

```
    6) Create a rule that Paragraph[1] = NULL and set this
    rule to the Field.
    }
    7) Else
    {
      8) DetermineUnitRules (fieldUnit, range). The function
    DetermineUnitRules creates the rules valid for the field
    unit and returns a vector of rules.
      9) Store the rules generated in step 8) in the rule vector present
    in Field.ruleVec
    }
    10) Return the Field.
    11) End.
```

DetermineUnitRules:

This is a function that determines unit rules.

The inputs to the process are a field unit and a range. The field unit could be a "Paragraph" or "Word" or "Sentence" or "Character". The function processes the input range and builds a set of rules according to the formatting applied on the range. The output is a vector of rules.

The implementation that will be described uses a local data structure RedundantUnitStyleIDTable. It is initially empty. This data structure is passed to the delegated function DetermineUnitLevelRules. The use of this structure will be explained with the explanation for the function DetermineUnitLevelRules.

The steps in one implementation of the function are as follows:

```
    1) Set RedundantUnitStyleIDTable to empty.
    2) If the input fieldUnit is a Paragraph,
    {
        ruleVectorParagraph = DetermineUnitLevelRules(Paragraph, Input
    Range, RedundantUnitStyleIDTable); These are the paragraph level rules.
        ruleVectorSentence = DetermineUnitLevelRules(Sentence, Input
    Range, RedundantUnitStyleIDTable); These are the sentence level rules.
        ruleVectorWord = DetermineUnitLevelRules(Word, Input Range,
    RedundantUnitStyleIDTable); These are the word level rules.
        ruleVectorCharacter = DetermineUnitLevelRules(Character, Input
    Range, RedundantUnitStyleIDTable); These are the character level rules.
        The function DetermineUnitLevelRules returns a vector of rules.
        Concatenate ruleVectorParagraph, ruleVectorSentence,
    ruleVectorWord, and ruleVectorCharacter.
        Return this concatenated rule vector.
    }
    3) If the input fieldUnit is a Sentence,
    {
        ruleVectorSentence = DetermineUnitLevelRules(Sentence, Input
    Range, RedundantUnitStyleIDTable); These are the sentence level rules.
        ruleVectorWord = DetermineUnitLevelRules(Word, Input Range,
    RedundantUnitStyleIDTable); These are the word level rules.
        ruleVectorCharacter = DetermineUnitLevelRules(Character, nput
    Range, RedundantUnitStyleIDTable); These are the character level rules.
        Concatenate ruleVectorSentence, ruleVectorWord, and
    ruleVectorCharacter Return this concatenated rule vector.
    }
    4) If the input fieldUnit is a Word,
    {
        ruleVectorWord = DetermineUnitLevelRules(Word, Input
    Range, RedundantUnitStyleIDTable); These are the word level rules.
        ruleVectorCharacter = DetermineUnitLevelRules(Character, Input
    Range, RedundantUnitStyleIDTable); These are the character level rules.
        Concatenate ruleVectorWord, and ruleVectorCharacter.
        Return this concatenated rule vector.
    }
    5) If the input fieldUnit is a Character,
    {
        ruleVectorCharacter = DetermineUnitLevelRules(Character, Input
    Range, RedundantUnitStyleIDTable); These are the character level rules.
        Return ruleVectorCharacter.
    }
    6) End
```

DetermineUnitLevelRules:

This is a helper function that determines unit level rules.

The inputs to the process are a field unit, a range and a RedundantUnitStyleIDTable. The field unit could be a "Paragraph" or "Word" or "Sentence" or "Character". The output is a vector of rules corresponding to the range of text.

The implementation that will be described maintains two local data structures: a styleIDVector, which is a vector of styleIDs; and a UnitIndexStyleID structure, which stores a unit index and the styleIDVector.

Consider the following example, in which the document text is "Sentence one is in italics. Sentence two is in bold."

If the input range of text to this function corresponds to the valid sentence "Sentence one is in italics." then the following rule is constructed for this sentence.

Sentence [1] is Italic, where Italic is the styleID of a style that defines an italics attribute.

A local data structure UnitIndexStyleID is maintained that stores all the styleIDs defined for a specific index. In this example, UnitIndexStyleID.index=1—To indicate that it is sentence 1.

UnitIndexStyleID.styleIDVector[0]=Italic—The styleID of Italic.

The UnitIndexStyleID structure and the corresponding unit "Sentence" are stored in the structure RedundantUnitStyleID after the above rule has been created, for example, as:

RedundantUnitStyleID.unit=Sentence

RedundantUnitStyleID.unitIndexStyleID=UnitIndexStyleID

A different RedundantUnitStyleID is created corresponding to every rule, and each RedundantUnitStyleID structure is stored in the input RedundantUnitStyleIDTable so that do redundant rules are not created, such as: Word [1] of Sentence [1]=Italic, Word [2] of Sentence [1]=Italic, and so on, because this information is already encapsulated in the previous rule:

Sentence[1] is Italic.

Also, while constructing the rule for an input unit, it is necessary to check for all instances of the input unit in the input range and for all attributes. If an attribute is applied on the whole unit, then it should have the same attribute value applied on the whole unit.

This point is illustrated in the following example, in which the input range of text corresponds to the sentence: "This is one sentence."

Though character formatting is applied on the complete sentence, the same value is not applied on the complete sentence. Other values and attributes could be used, e.g., color and particular color values.

Therefore, no rule is created at sentence level, but rather the following word level rules are created:

Word [1] of Sentence [1] is Bold

Word [2] of Sentence [1] is Italic

Word [3] of Sentence[1] is Bold

Word [4] of Sentence[1] is Italic

Attributes in general can be classified as character level attributes or paragraph level attributes. For example, "Color" is a character level attribute; whereas "Paragraph Alignment" is a paragraph level attribute. A paragraph level attribute is any attribute that applies to all characters in the paragraph. That is, no two characters in the same paragraph can two different paragraph level attributes; whereas two characters of a paragraph may have different character level attributes.

In one implementation, the function DetermineUnitLevelRules performs the following actions.

1) Input unit and range are provided as function inputs.
2) If input unit is a Paragraph, then AttributeSet is the set of all character and paragraph attributes.
3) If input unit is not a Paragraph, then AttributeSet is the set of all character attributes.
4) For every instance 'i' of input unit in the range,
{
  5) Set styleIDVector to empty.
  6) for every attribute j in the AttributeSet
  {
    7) Set attribute = AttributeSet[j]
    8) if (attribute is applied on the whole unit 'i' AND if the same attribute value of attribute is applied on the whole unit AND if attribute value has a non default value)
    {
      9) styleID = GetStyleID(attribute, attributeValue);
      10) If IsStyleIDDistinct(RedundantUnitStyleIDTable, styleID, input unit, input range, instance 'i').
      {
        11) Store the styleID in a styleIDVector
        As IsStyleIDDistinct is TRUE , this is NOT a redundant styleID. Thus, the process stores the styleID. This helper function is described later.
      }
    }
  }
  12) The list of styleIDs applied on unit 'i' is now set.
  Set: UnitIndexStyleID.index = i
  UnitIndexStyleID.styleIDVector = styleIDVector
  13) Store each of the UnitIndexStyleID structures in the UnitIndexStyleIDTable.
}
14) Store the input unit and the UnitIndexStyleIDTable in a structure RedundantUnitStyleID and append this to the RedundantUnitStyleIDTable.
15) for (k = 0; k < UnitIndexStyleIDTable.size; ++k)
{
  16) Rule Vector = CreateRule (UnitIndexStyleIDTable [k].index, input unit, input range, UnitIndexStyleIDTable [k].styleIDVector)
  17) CreateRule in step 16 returns a Rule Vector. Append this to an OutputRuleVector
}
18) Return OutputRuleVector.
19) End

IsStyleIDDistinct

This is helper function that determines if the styleID corresponding to a unit is redundant or not. For example, if there already is a rule such as Sentence[1] is Red, it is not necessary to create rules such as Word [1] of Sentence [1]=Red, Word [2] of Sentence [1]=Red, and so on.

The inputs of one implementation of this functions are: RedundantUnitStyleIDTable; a styleID; an input unit; an input range; and the instance of the input unit in the input range or the absolute index. The output is a boolean value true or false.

The actions of this implementation of this functions are as follows:

1) Get the relative position of the input unit in the input range by calling:
GetRelativeIndex (input rule unit, input range, input absolute index, character index, word index, sentence index, paragraph index, STANDARD)
2) If input unit is Sentence
{
  3) Check from the RedundantUnitStyleIDTable that paragraph corresponding to the paragraph index does not have the input styleID applied.
  4) If check in 3) passes, return TRUE; otherwise return FALSE.
}
5) If input unit is Word
{
  6) Check from the RedundantUnitStyleIDTable that the sentence corresponding to the sentence index does not have the input styleID applied AND the paragraph corresponding to the paragraph index does not have the input styleID applied.
  7) If check in 6) passes, return TRUE; Else return FALSE
}
8) If input unit is Character
{
  9) Get the absolute index of the word that this non-whitespace character is present in.
  10) Check from the RedundantUnitStyleIDTable that the word denoted by the absolute word index of step 9) index does not have the input styleID applied AND the sentence corresponding to the sentence index does not have the input styleID applied AND the paragraph corresponding to the paragraph index does not have the input styleID applied)
  11) If check in 10) passes, return TRUE; otherwise return FALSE.
}
12) End GetStyleID This is a helper function that takes as input an attribute and an attribute value. It returns the paragraph style ID or character style ID of the style that has been defined with just the "attribute" and the same "attribute value" as the input.

For example, if the input attribute is a character attribute such as "Color" and the attribute value is "Red", the function first checks if a character style has already been defined with only the Color attribute set to Red. If yes, the function returns the styleID of this character style. If not, it will create an appropriate style and return this styleID. Also, the input attribute could be a paragraph attribute, in which case the function first checks if there is a paragraph style that just conforms to the (attribute, attribute value) definition and returns this style ID if one is found. If not, it creates a new appropriate paragraph style and returns this styleID.

The inputs to the function are as follows:
Attribute
Attribute Value
The outputs of this function are as follows:
A style ID of a paragraph style or a character style.
The function operates as follows:

```
1) Input the attribute and attribute value
2) Is attribute a character attribute
   {
   3) Check if the CharacterStyleTable has any style with only
the definition of the input attribute equal to the input attribute value
       4) If no style is found in step 3), create a new character style
whose input attribute is the same as the input attribute value.
Store the new character style in the CharacterStyleTable.
       5) Return the style ID as found in step 3) or 4)
   }
   6) If attribute is a paragraph attribute
   {
   7) Check if the ParagraphStyleTable has any style with only
the definition of the input attribute equal to the input attribute value
       8) If no style is found in step 7), create a new paragraph style
whose input attribute is the same as the input attribute value.
Store the new paragraph style in the ParagraphStyleTable.
       9) Return the style ID as found in step 7) or 8)
   }
   10) End
```

CreateRule

CreateRule is a helper function that is given an input rule unit, an input rule unit index, an input range and a vector of style IDs. It creates rule objects corresponding to each style ID in the input styleIDVector.

Each of these rule objects is stored in an Output Rule Vector and returned.

The rule unit index is an absolute rule unit index within the input range. For example, it could be word 40 of a paragraph input range, and will be converted into the appropriate relative index such as Word [3] of Sentence [4] of Paragraph[1].

In one implementation, the CreateRule function performs the following actions.

```
1) Input ruleUnit, ruleIndex and a styleIDVector as input.
2) Create an empty OutputRuleVector.
3) For (i=0; i< styleIDVector.size; ++i)
   {
   4) Create an empty Rule and UnitAndIndexVector
   5) UnitAndIndexVector = FillUnitAndIndexVector (input rule
unit, input absolute rule unit index, input range)
   6) Rule.UnitAndIndexVector = UnitAndIndexVector
   7) Set Rule.styleID = styleIDVector[i]
   8) Append Rule to OutputRuleVector
   }
9) Return OutputRuleVector
10) End
```

FillUnitAndIndexVector

FillUnitAndIndexVector is a helper function that determines the relative position of an index of the input rule unit in the input range and creates an appropriate UnitAndIndexVector.

It is sometimes possible to express the relative position of an index in more than one way. To refer to the last word of a five word sentence, one could either refer to Word 5 of the sentence or Last Word of the sentence. The latter is referred to as the intelligent way.

Because the goal is to extract a record-based style for records, and each record could have different words in a sentence, it makes more sense to refer to the relative position intelligently, especially when describing LAST.

The choice of whether to incorporate this sort of intelligence or not can be configured as a user interface option in a dialog. Optionally, the record-based style can be extracted both ways. That way multiple record-based styles corresponding to the underlying context can be generated.

Below are some examples.

Example 1

Let the input rule unit be a word and the input rule unit index be 40 and the input range be that of a valid paragraph. This function will determine which sentence of the paragraph this word belongs to and what the corresponding index is of this word in the sentence. Let us assume that word 40 of a paragraph is actually the fifth word of the third sentence of a ten sentence paragraph. Then, the following UnitAndIndex objects will be set in the output UnitAndIndexVector as follows:

| INTELLIGENT | STANDARD |
| --- | --- |
| UnitAndIndexVector[0].unit = Word | UnitAndIndexVector[0].unit = Word |
| UnitAndIndexVector[0].index = 5 | UnitAndIndexVector[0].index = 5 |
| UnitAndIndexVector[1].unit = Sentence | UnitAndIndexVector[1].unit = Sentence |
| UnitAndIndexVector[1].index = 3 | UnitAndIndexVector[1].index = 3 |
| UnitAndIndexVector[2].unit = Paragraph | UnitAndIndexVector[2].unit = Paragraph |
| UnitAndIndexVector[2].index = 1 | UnitAndIndexVector[2].index = 1 |

Example 2

Let the input rule unit be a word and the input rule unit index be 100 and the input range be that of a valid paragraph, and let Word 100 be the last word of a 10 sentence paragraph and let this last sentence have just 10 words. Then, the following UnitAndIndex objects will be set in the output UnitAndIndexVector as follows:

| INTELLIGENT | STANDARD |
| --- | --- |
| UnitAndIndexVector[0].unit = Word | UnitAndIndexVector[0].unit = Word |
| UnitAndIndexVector[0].index = LAST | UnitAndIndexVector[0].index = 10 |
| UnitAndIndexVector[1].unit = Sentence | UnitAndIndexVector[1].unit = Sentence |
| UnitAndIndexVector[1].index = LAST | UnitAndIndexVector[1].index = 10 |

-continued

| INTELLIGENT | STANDARD |
|---|---|
| UnitAndIndexVector[2].unit = Paragraph | UnitAndIndexVector[2].unit = Paragraph |
| UnitAndIndexVector[2].index = 1 | UnitAndIndexVector[2].index = 1 |

Example 3

Let the input rule unit be a word and the input rule unit index be 10 and the input range be that of a valid paragraph, and let Word 10 of the paragraph be the last word of the first sentence of the paragraph. Then, the following UnitAndIndex objects will be set in the output UnitAndIndexVector as follows:

| INTELLIGENT | STANDARD |
|---|---|
| UnitAndIndexVector[0].unit = Word | UnitAndIndexVector[0].unit = Word |
| UnitAndIndexVector[0].index = LAST | UnitAndIndexVector[0].index = 10 |
| UnitAndIndexVector[1].unit = Sentence | UnitAndIndexVector[1].unit = Sentence |
| UnitAndIndexVector[1].index = 1 | UnitAndIndexVector[1].index = 1 |
| UnitAndIndexVector[2].unit = Paragraph | UnitAndIndexVector[2].unit = Paragraph |
| UnitAndIndexVector[3].index = 1 | UnitAndIndexVector[2].index = 1 |

Example 4

Similarly, as another example, assume that the first letter of the second word of a sentence is Bold. If the rule unit is a character and its corresponding non-whitespace rule unit has index of 1 and if the input range corresponds to that of a valid paragraph, then the following UnitAndIndex objects will be set in the output UnitAndIndexVector as follows:

| INTELLIGENT | STANDARD |
|---|---|
| UnitAndIndexVector[0].unit = Character | UnitAndIndexVector[0].unit = Character |
| UnitAndIndexVector[0].index = 1 | UnitAndIndexVector[0].index = 1 |
| UnitAndIndexVector[1].unit = Word | UnitAndIndexVector[1].unit = Word |
| UnitAndIndexVector[1].index = 2 | UnitAndIndexVector[1].index = 2 |
| UnitAndIndexVector[2].unit = Sentence | UnitAndIndexVector[2].unit = Sentence |
| UnitAndIndexVector[2].index = 1 | UnitAndIndexVector[2].index = 1 |
| UnitAndIndexVector[3].unit = Paragraph | UnitAndIndexVector[3].unit = Paragraph |
| UnitAndIndexVector[3].index = 1 | UnitAndIndexVector[3].index = 1 |

The FillUnitAndIndexVector function calls a helper function called GetRelativeIndex that returns the relative index for character, word, sentence, paragraph.

The inputs of the FillUnitAndIndexVector function are an input rule unit, an input absolute rule unit index, and an input range. The output of the function is an output UnitAndIndexVector.

The following sequence of actions shows how one implementation of the function gets a UnitAndIndexVector corresponding to a whole paragraph. For the sake of brevity, the actions to get an appropriate UnitAndIndexVector for an input range corresponding to a sentence or a word are omitted. The actions for a whole paragraph are as follows.

```
1) If input range is a valid paragraph range
{
  2) If input rule unit is Paragraph
  {
  3) Set:
  UnitAndIndexVector[0].unit = Paragraph
  UnitAndIndexVector[0].index = 1
  }
  4) If input rule unit is Sentence
  {
  5) GetRelativeIndex (input rule unit, input range, input absolute index, character
index, word index, sentence index, paragraph index, GlobalOption). Depending on the
GlobalOption of INTELLIGENT or STANDARD, GetRelativeIndex will return the
corresponding relative character index, relative word index, relative sentence index, and
relative paragraph index.
  6) Set:
    UnitAndIndexVector[0].unit = Sentence
    UnitAndIndexVector[0].index = sentence index
    UnitAndIndexVector[1].unit = Paragraph
    UnitAndIndexVector[1].index = 1
  }
  7) If input rule unit is Word
  {
  8) GetRelativeIndex (input rule unit, input range, input absolute index, character
index, word index, sentence index, paragraph index, GlobalOption)
  9) Set:
    UnitAndIndexVector[0].unit = Word
    UnitAndIndexVector[0].index = word index
    UnitAndIndexVector[1].unit = Sentence
    UnitAndIndexVector[1].index = sentence index
    UnitAndIndexVector[2].unit = Paragraph
    UnitAndIndexVector[2].index = 1
  }
  10) If input rule unit is Character
  {
  11) GetRelativeIndex (input rule unit, input range, input absolute index, character
```

```
index, word index, sentence index, paragraph index, GlobalOption)
    12) Set:
        UnitAndIndexVector[0].unit = Character
        UnitAndIndexVector[0].index = character index
        UnitAndIndexVector[1].unit = Word
        UnitAndIndexVector[1].index = word index
        UnitAndIndexVector[2].unit = Sentence
        UnitAndIndexVector[2].index = sentence index
        UnitAndIndexVector[3].unit = Paragraph
        UnitAndIndexVector[3].index = 1
    }
    16) Return UnitAndIndexVector
    17) End
```

GetRelativeIndex

GetRelativeIndex is a function that is available as a native function in many word processing applications. From the given input range it determines the relative position of the input unit in terms of its relative non-whitespace character, word, sentence, and paragraph coordinates.

The only additional thing that the function GetRelativeIndex does is return the index as LAST if required by an input option.

The inputs of one implementation the GetRelativeIndex function are an input rule unit, an absolute rule unit index within the input range, an input range, and an Option (INTELLIGENT or STANDARD). The outputs are a relative character index, a relative word index, a relative sentence index, and a relative paragraph index.

In this implementation the function performs the following sequence of actions:

1) Get the relative character index, word index, sentence index, and paragraph index of the input rule unit using the input absolute rule unit index from the input range. This step determines whether the input range corresponds to a paragraph, a sentence, a word, or a character, and correspondingly determines the relative indices of the input unit in terms of paragraph, sentence, word, or character.

2) If the relative sentence index computed in the previous step corresponds to the last sentence of a paragraph in the input range AND if input option is INTELLIGENT, set sentence index=LAST.

3) If the relative word index computed in the previous step corresponds to the last word of a sentence of the input range AND if input option is INTELLIGENT, set word index=LAST.

4) If the relative non-whitespace character index computed in the previous step corresponds to the last character of a word of the input range AND if input option is INTELLIGENT, set character index=LAST.

5) End.

Merging Multiple Fields

Another way to generate multiple record-based styles is to merge fields and generate a new record-based style definition.

If any two adjacent fields have the same field unit and a fixed sized field count, one can merge these fields, and correspondingly adjust the field counts and the rule unit indices of the merged field. This way, a new record-based style can be generated from an existing record-based style.

Consider as an example a record-based style defined as follows:

Field 1: [1] Paragraph
Rule: Word [1] of Sentence[1] of Paragraph[1]=Red
Field 2: [1] Paragraph
Rule: Word [1] of Sentence[1] of Paragraph[1]=Blue This can be merged as
Field 1: [2] Paragraph
Rule: Word [1] of Sentence[1] of Paragraph[1]=Red
Rule: Word [1] of Sentence[1] of Paragraph[2]=Blue In this way, adjacent fixed sized fields which have the same field unit can be merged.

Since the rule units of the extracted record-based styles are specified up to the level of the field unit, they can very easily be merged. All that needs to be done when merging two fields is to increment appropriately the rule unit index of the rule units of every rule in the second field that correspond to the level of the field unit. In the above example, the incremented rule unit index is the index of "Paragraph" in the second rule, which has been incremented to 2.

The actions performed in one implementation of a function that merges any two adjacent fields are as follows. The inputs to the function are two fixed sized fields (referred to as the first field and second field respectively) having the same field unit. The output is a fixed size merged field.

```
1) If the rule unit of outermost level of rule of the two
    input fields are the same
    {
    2) Create a new merged field.
    3) Set the field unit of the merged field from step 2) to the field
unit of the input fixed sized field.
        4) Set the field count of the merged field to the sum of the
field counts of the two input fields.
        5) Append the rules of first field to the merged field.
        6) Append each rule of the second field to the merged field, after
incrementing by the field count of the first input field, the rule unit index
of the rule unit that is the same as the field unit of the merged field.
        7) return the merged field.
    }
    8) End
```

Using such a function, one can first extract record-based styles and then form newer record-based styles out of the extracted styles, by simply merging the fields of the extracted record-based styles.

There are other ways to extract multiple record-based styles.

For example, one could check if whole words are NUMBERS or define styles based on the content of some of the structures.

Embodiments of the invention and all of the functional operations described in this specification can be implemented in digital electronic circuitry, or in computer software, firmware, or hardware, including the structural means disclosed in this specification and structural equivalents thereof, or in combinations of them. Embodiments of the invention can be implemented as one or more computer program products, i.e., one or more computer programs tangibly embodied in an information carrier, e.g., in a machine-readable storage device, in a machine-readable storage medium, or in a propagated signal, for execution by, or to control the operation of, data processing apparatus, e.g., a programmable processor, a computer, or multiple processors or computers, which apparatus can include, in addition to hardware, general programming, e.g., processor firmware, a protocol stack, a database management system, or an operating system. A propagated signal is an artificially generated signal, e.g., an electrical, optical, or electromagnetic signal, that is made to communicate a computer program directly or indirectly to apparatus by which the program can be stored, executed, or both. A computer program (also known as a program, software, software application, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file. A program can be stored in a portion of a file that holds other programs or data, in a single file dedicated to the program in question, or in multiple coordinated files (e.g., files that store one or more modules, sub-programs, or portions of code). A computer program can be deployed to be executed on one computer or on multiple computers at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio player, a Global Positioning System (GPS) receiver, to name just a few. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the invention can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Particular embodiments of the invention have been described. Other embodiments are within the scope of the following claims. For example, the actions recited in the claims can be performed in a different order and still achieve desirable results.

What is claimed is:

1. A non-transitory computer-readable storage media having instructions, stored thereon, the instructions operable to cause a data processing apparatus to:
    display formatted content from a source document to a user;
    receive from the user an input selecting a portion of the displayed formatted content and identifying the selected portion as a logical record within the source document;
    generate from the selected portion one or more style definitions, each style definition defining a corresponding style in terms of one or more contiguous fields of the selected portion and in terms of one or more rules, each field being defined with a count of a specified number of occurrences of a respective unit of formatted content in the selected portion, each rule based on formatting values or content values or structure values that are associated with a respective unit of formatted content of at least one of the fields, each style definition matching the entire selected portion and configured to apply to multiple logical records of a target document, and wherein applying the style definition to the target document comprises (i) determining, for each field of the style definition, whether the specified number of occurrences of the field's respective content unit structure is present among the logical records of the target document and (ii) applying to the logical records of the target document formatting values or content values or structure values according to the rules of the style definition;
    present one or more samples that match a user-selected style definition, each sample having a boundary at a beginning and a boundary at an end of the sample;
    receive a user input to change a boundary of a first sample of the one or more samples presented to the user;
    use the changed boundary to redefine a style definition corresponding to the first sample; and
    use the changed boundary to generate a new style definition corresponding to the first sample.

2. The non-transitory computer-readable storage media of claim 1, wherein the instructions are further operable to cause the data processing apparatus to:
    define each field in terms of a variable number of occurrences of a unit of formatted content, wherein the variable number of occurrences is a range of numbers of occurrences, a list of numbers of occurrences, or both.

3. The non-transitory computer-readable storage media of claim 1, further comprising instructions operable to cause the data processing apparatus to:
    define a style in terms of two or more contiguous fields, each field being defined in terms of a number of occurrences of a respective unit of formatted content.

4. The non-transitory computer-readable storage media of claim 1, wherein the instructions are further operable to cause the data processing apparatus to:
    present the one or more style definitions to a user.

5. The non-transitory computer-readable storage media of claim 1, wherein the instructions are further operable to cause the data processing apparatus to:

select automatically a default style from among the styles defined by the one or more style definitions; and receive as user input an apply-style command and apply the default style in response to the command.

6. The non-transitory computer-readable storage media of claim 1, wherein the instructions are further operable to cause the data processing apparatus to:

receive from the user a style formatting input for a particular style definition of the one or more style definitions, the style formatting input defining a formatting change to be applied to parts of a destination document content matching the particular style definition.

7. The non-transitory computer-readable storage media of claim 1, wherein the instructions are further operable to cause the data processing apparatus to:

receive from the user a style formatting input for a particular style definition of the one or more style definitions, the style formatting input defining a formatting change or a content change or both to be applied to parts of a destination document content matching the particular style definition.

8. The non-transitory computer-readable storage media of claim 1, wherein the instructions are further operable to cause data processing apparatus to:

define each field in terms of a respective one or more units of formatted content, the units being selected from a group including paragraph, sentence, word, and character.

9. The non-transitory computer-readable storage media of claim 1, wherein the instructions are further operable to cause data processing apparatus to:

associate a sub-unit rule with a sub-unit of a unit of a first field from among the contiguous fields, a sub-unit being a unit of content that is a constituent of the unit of the first field.

10. The non-transitory computer-readable storage media of claim 9, wherein the unit of the first field is a paragraph unit and the sub-unit is a sentence, word, or character unit.

11. A non-transitory computer-readable storage media having instructions stored thereon, the instructions operable to cause a data processing apparatus to:

receive a style, the style being a record-based style defined as a sequence of two or more contiguous style fields and based on one or more rules, each style field being defined so as to apply if a specified number of occurrences of a respective content unit structure are present, each rule based on formatting values or content values or structure values that are associated with a respective content unit structure of at least one of the style fields;

receive a command applying the style to formatted text content;

identify in response to the received command a result set of multiple logical records within the formatted text content, the logical records being non-overlapping, each logical record having a number of content fields that matches the specified number of occurrences of each style field's respective content unit structure, and each logical record matching formatting values or content values or structure values according to the rules for the style; and display a first logical record in the result set with a demarcation of boundaries between occurrences of the content fields in the first logical record.

12. The non-transitory computer-readable storage media of claim 11, wherein:

the rules of the style fields of the style include a rule specifying a formatting attribute and attribute value.

13. The non-transitory computer-readable storage media of claim 12, wherein:

the formatting attribute is a paragraph alignment formatting attribute or a character color formatting attribute.

14. The non-transitory computer-readable storage media of claim 11, wherein the instructions are further operable to cause the data processing apparatus to:

display the first logical record in the result set with a demarcation of boundaries between occurrences of unit structures in the first logical record.

15. The non-transitory computer-readable storage media of claim 11, wherein the instructions are further operable to cause the data processing apparatus to:

display a structure of the style fields in the style matching the first logical record.

16. A non-transitory computer-readable storage media having instructions stored thereon, the instructions operable to cause a data processing apparatus to:

receive a first style, the first style being a record-based style defined as a sequence of two or more contiguous style fields and based on one or more rules, each style field being so as to apply to a specified number of occurrences of a respective content unit structure, each rule being based on formatting values or content values or structure values that are associated with a respective content unit structure of at least one of the style fields of the first style;

receive a second style, the second style being a record-based style defined as a sequence of two or more contiguous style fields and based on one or more rules, each style field being so as to apply to a specified number of occurrences of a respective content unit structure, each rule being based on formatting values or content values or structure values that are associated with a respective content unit structure of at least one of the style fields of the second style;

apply the first style to formatted text content, the formatted text content including a result set of multiple logical records, the logical records being non-overlapping, each logical record having a number of content fields that matches the specified number of occurrences of each style field's respective content unit structure in the first style, and each logical record matching formatting values or content values or structure values according to the rules for the first style; and apply the second style to the logical records of the result set within the formatted text content that match the first style.

17. The non-transitory computer-readable storage media of claim 16, wherein the instructions to apply the second style to the logical records of the result set are further operable to cause the data processing apparatus to:

apply the second style only to logical records of the result set that match the second style.

18. The non-transitory computer-readable storage media of claim 16, wherein instructions to apply the second style comprise instructions to modify content in accordance with the second style.

19. A non-transitory computer-readable storage media having instructions stored thereon, the instructions operable to cause a data processing apparatus to:

receive a first input defining a context, the context being formatted contiguous content;

receive a definition of a first style, the first style being a record-based style defined as a sequence of two or more contiguous fields, each field being defined so as to apply to a specified number of occurrences of a respective content unit structure and having one or more rules based on formatting values or content values or structure values that are associated with the respective content unit structure; and apply the first style to the context by matching for each field of the first style the specified number of occurrences of the field's respective content unit structure with the context and changing a format or content or structure of the matched context according to the rules for the field.

20. A system comprising:

means for receiving a first style, the first style being a record-based style defined as a sequence of two or more contiguous style fields and one or more rules, each style field being defined so as to apply if a specified number of occurrences of a respective content unit structure are present, each rule being based on formatting values or content values or structure values that are associated with a respective content unit structure of at least one of the style fields of the first style;

means for receiving a second style, the second style being a record-based style defined as a sequence of two or more contiguous style fields and one or more rules, each field being defined so as to apply to a specified number of occurrences of a respective content unit structure are present, each rule being based on formatting values or content values or structure values that are associated with a respective content unit structure of at least one of the style fields of the second style; and means for applying the first style to formatted text content, the formatted text content including a result set of multiple logical records, the logical records being non-overlapping, each logical record having a number of content fields that matches the specified number of occurrences of the style field's respective content unit structure in the first style, and each logical record matching formatting values or content values or structure values according to the rules for the first style; and means for applying the second style to the logical records of the result set within the formatted text content that match the first style by (i) determining whether the specified number of occurrences of the content fields of each logical record is present among the number of occurrences of the style field's respective content unit structure in the second style, and (ii) changing formatting values or content values or structure values of the logical records according to the rules for the second style.

* * * * *